Aug. 1, 1967    C. HORBERG, JR    3,333,748
HOSIERY PROCESSING MACHINERY AND APPARATUS
Original Filed Feb. 15, 1963    17 Sheets-Sheet 1

INVENTOR.
CHARLES HORBERG JR.

BY Burns, Doane, Benedict,
Swecker & Mathis
ATTORNEYS

INVENTOR.
CHARLES HORBERG JR.
BY
ATTORNEYS

Aug. 1, 1967  C. HORBERG, JR  3,333,748
HOSIERY PROCESSING MACHINERY AND APPARATUS
Original Filed Feb. 15, 1963  17 Sheets-Sheet 4
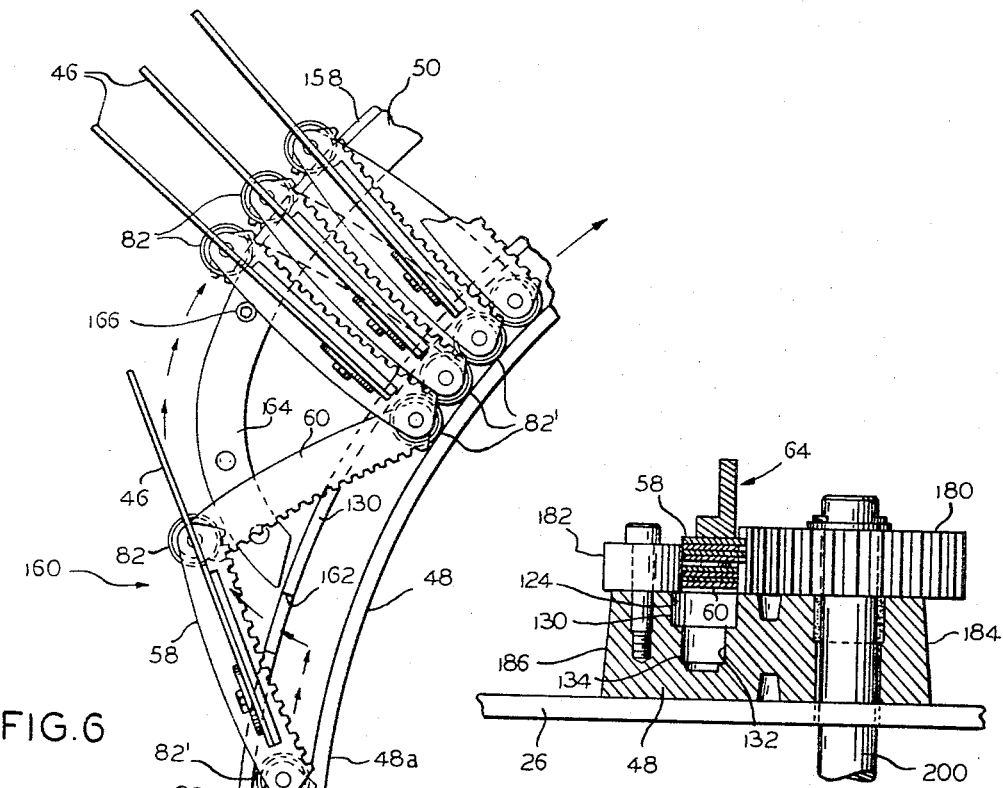
FIG. 6
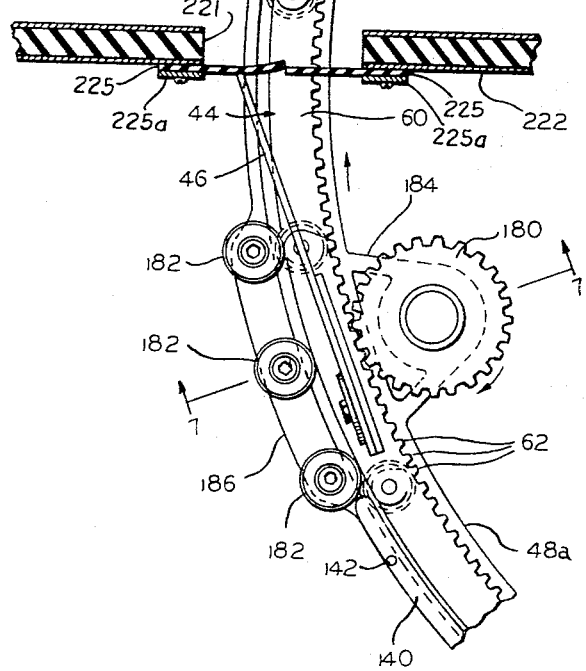
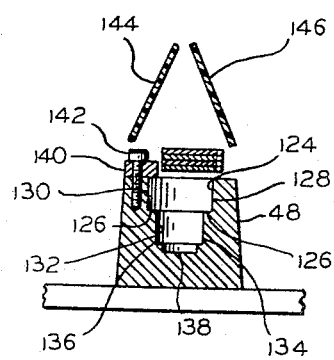
FIG. 7
FIG. 8
INVENTOR.
CHARLES HORBERG JR.
BY *Burns, Doane, Benedict,*
*Swecker & Mathis*
ATTORNEYS

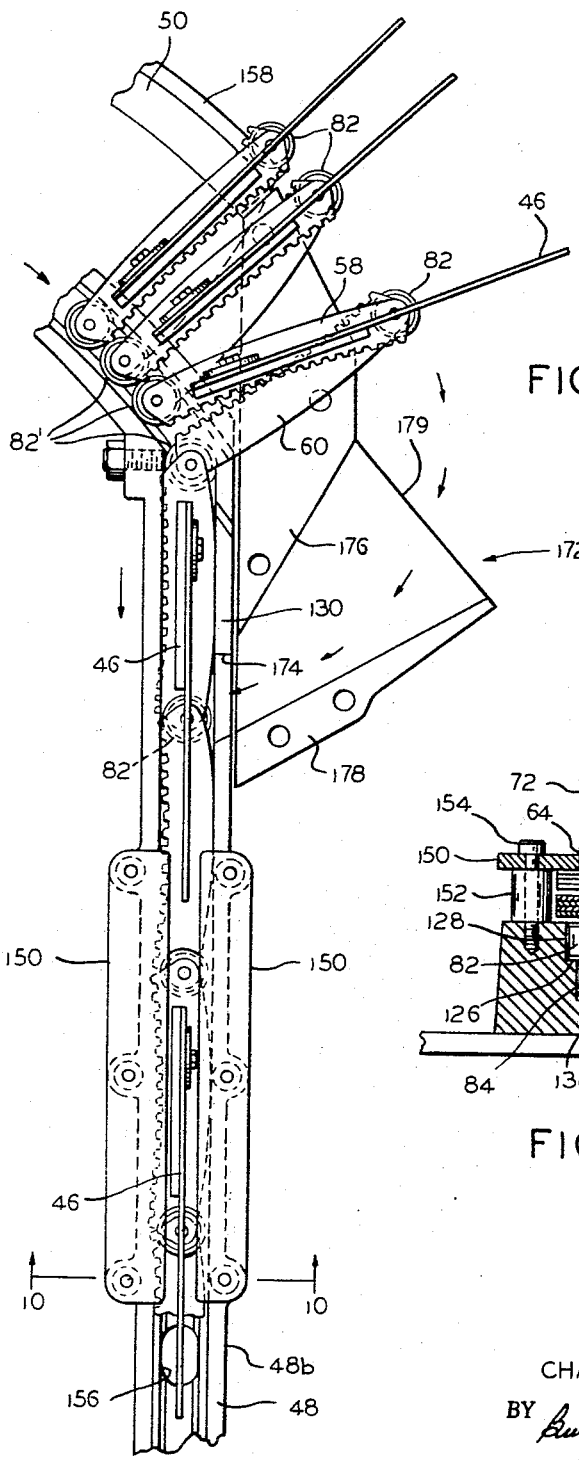

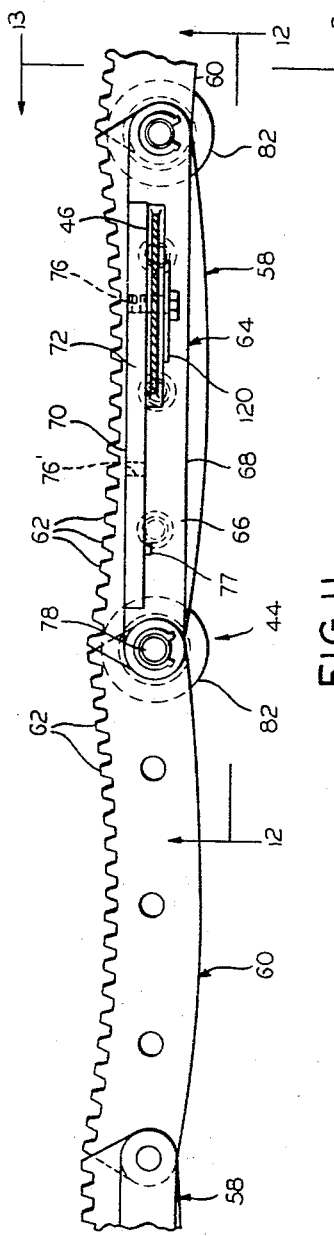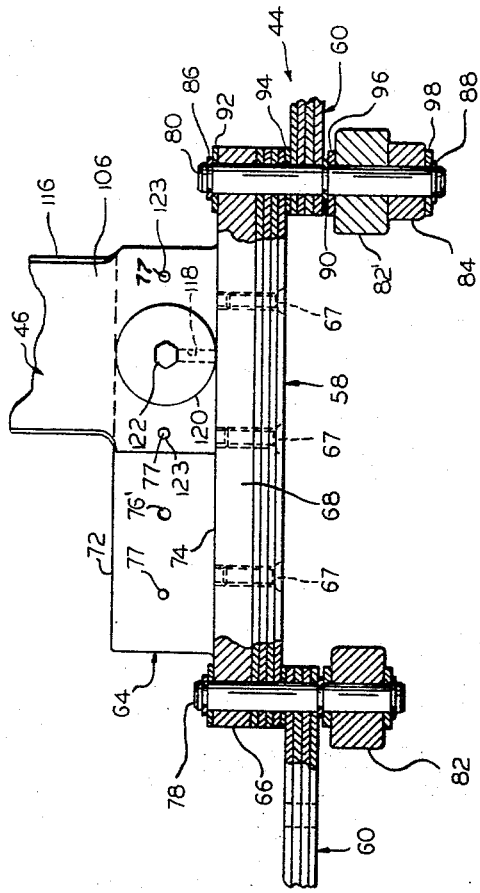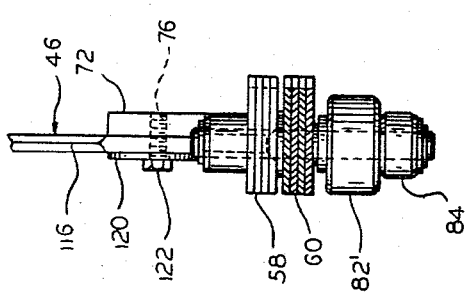

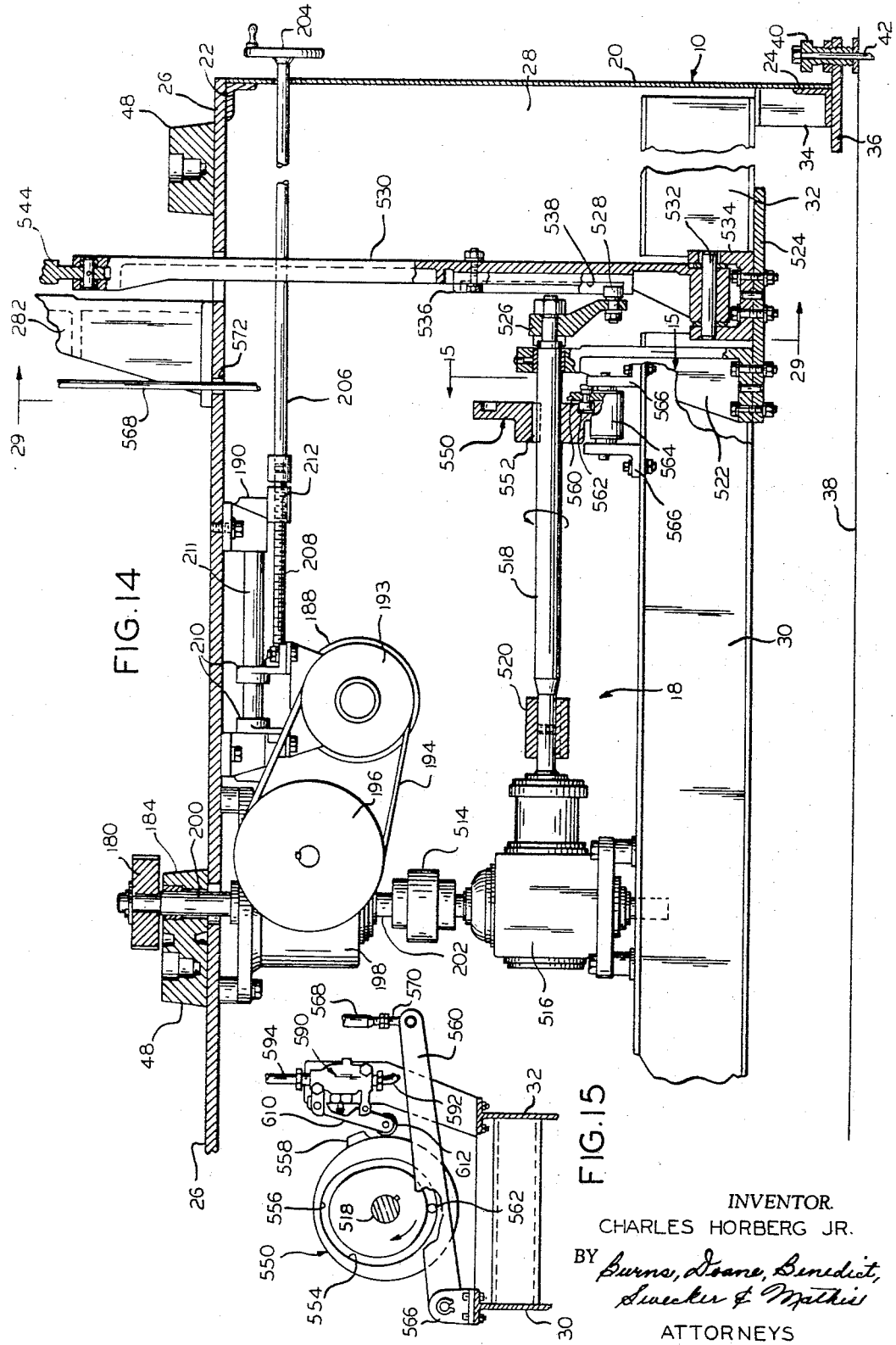

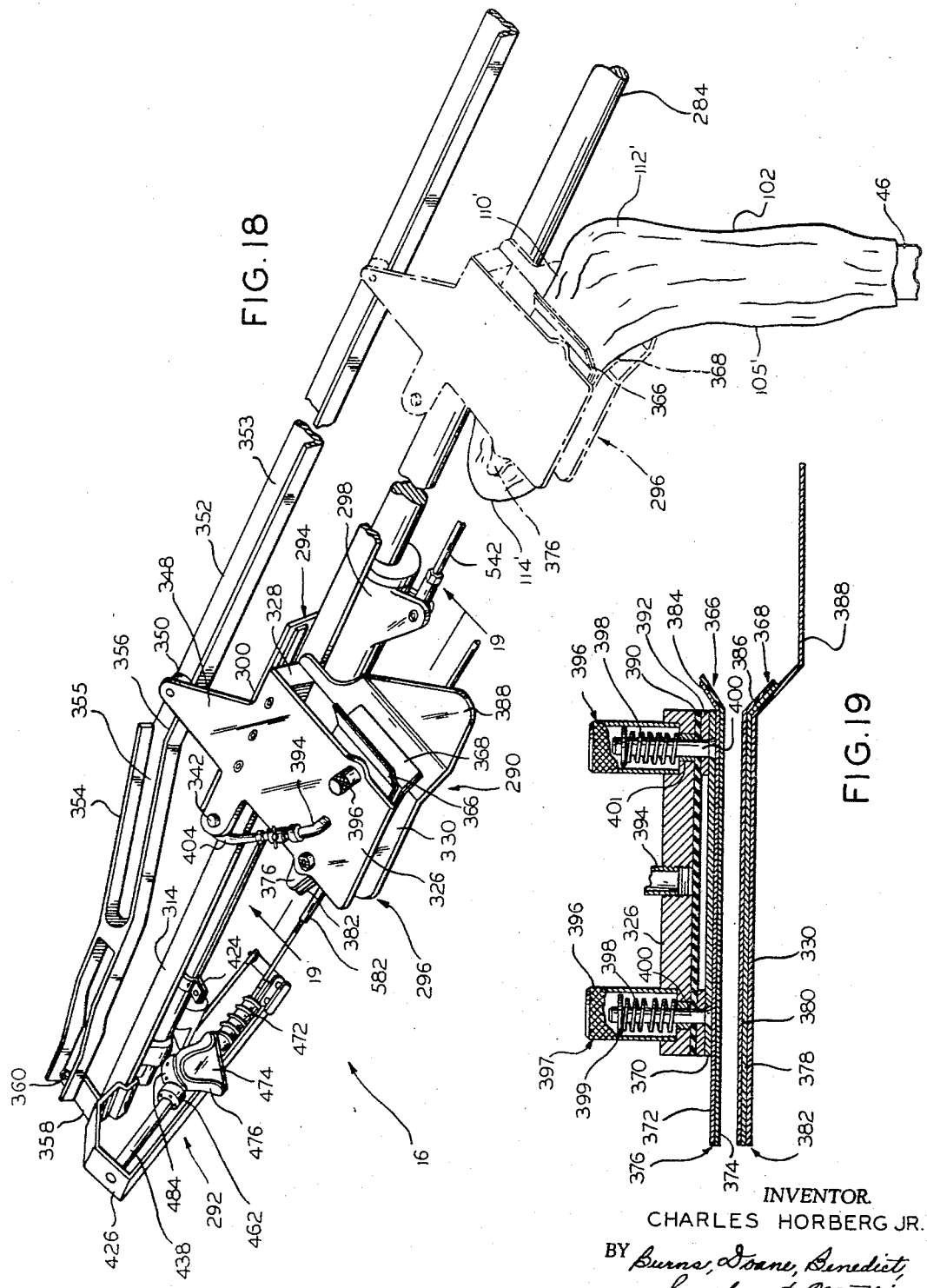

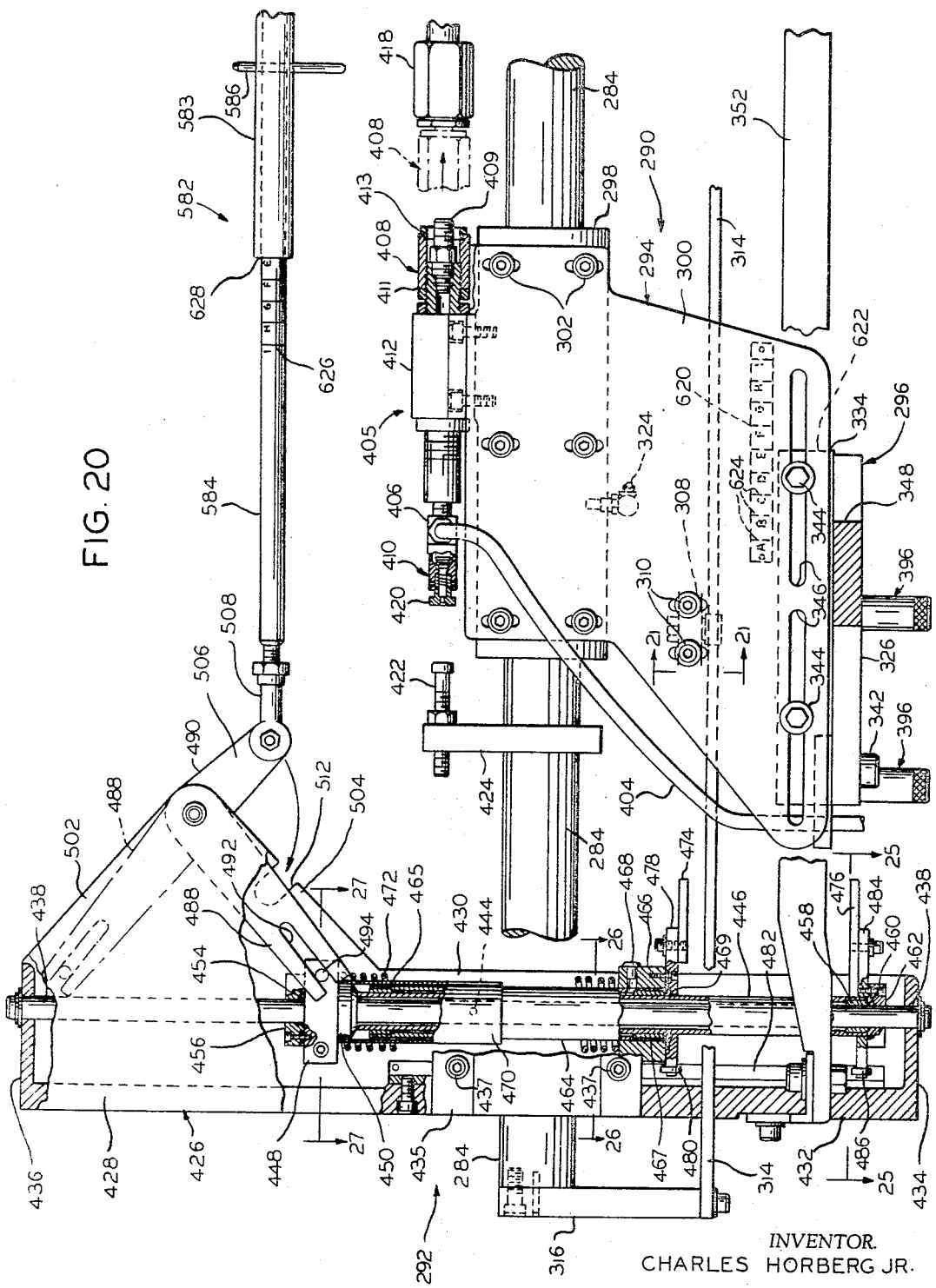

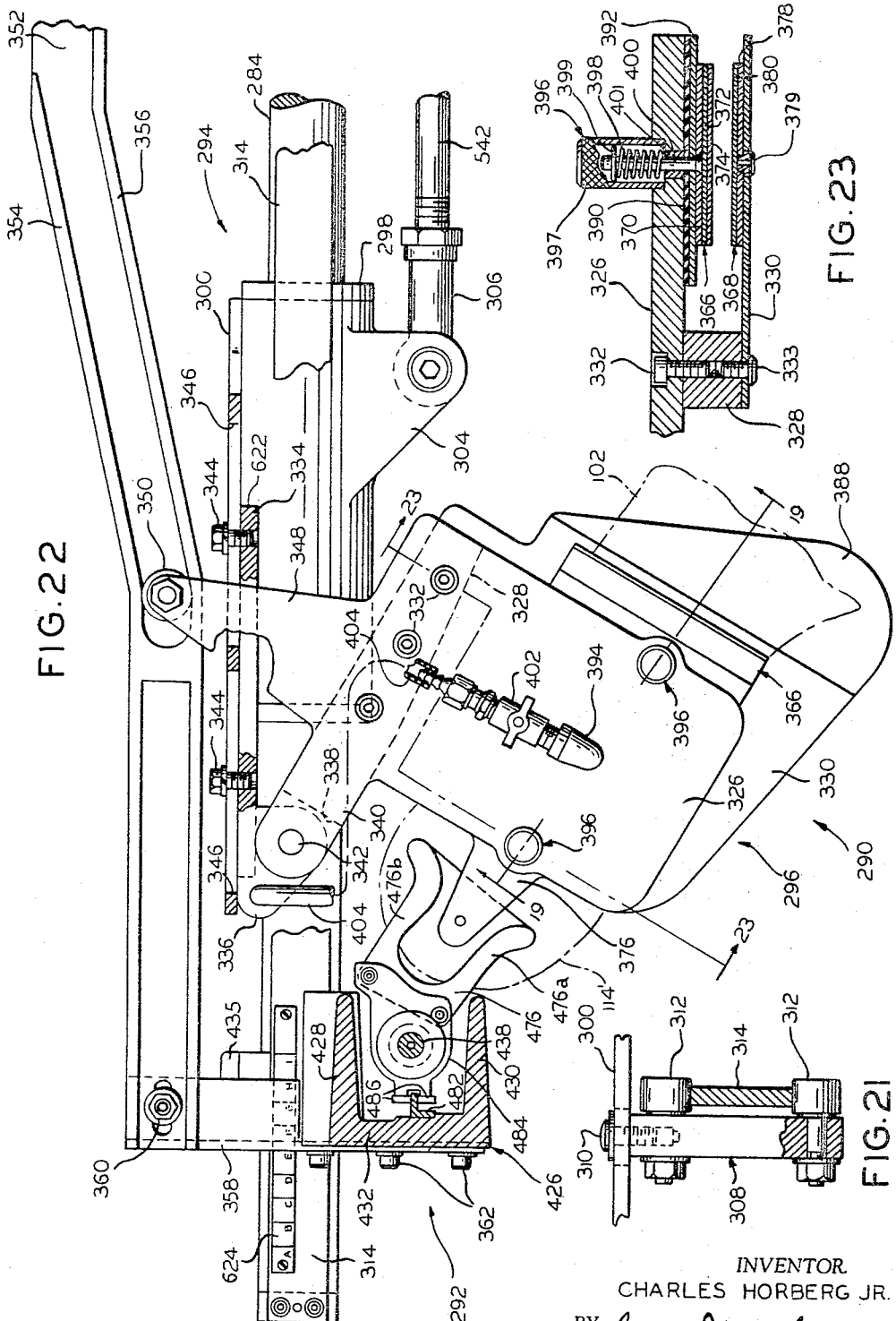

Aug. 1, 1967  C. HORBERG, JR  3,333,748
HOSIERY PROCESSING MACHINERY AND APPARATUS
Original Filed Feb. 15, 1963  17 Sheets-Sheet 13
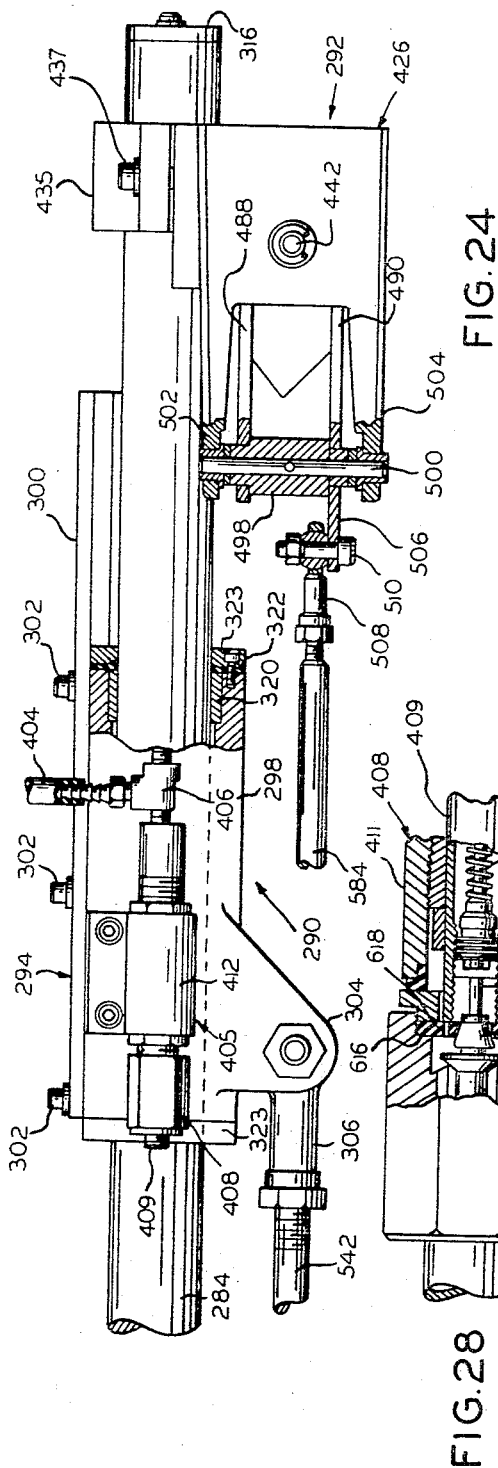
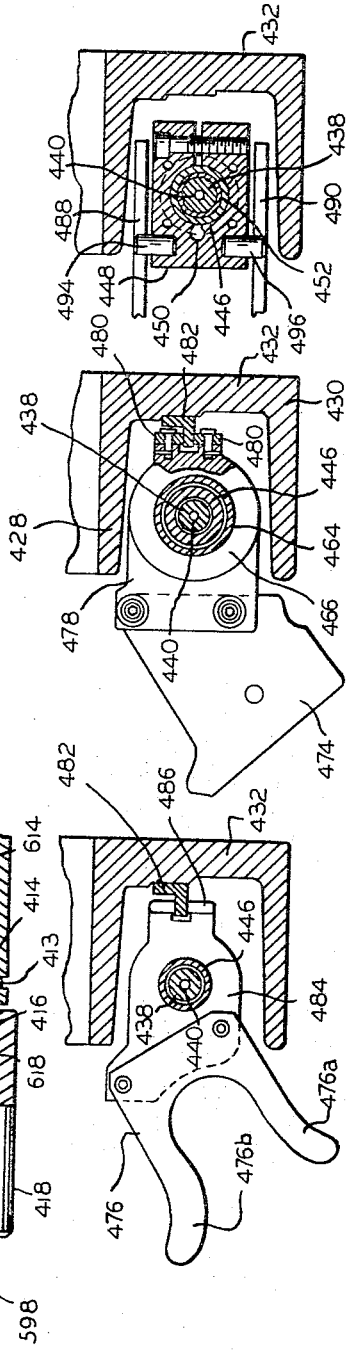
INVENTOR.
CHARLES HORBERG JR.
BY Burns, Doane, Benedict,
Swecker & Mathis
ATTORNEYS

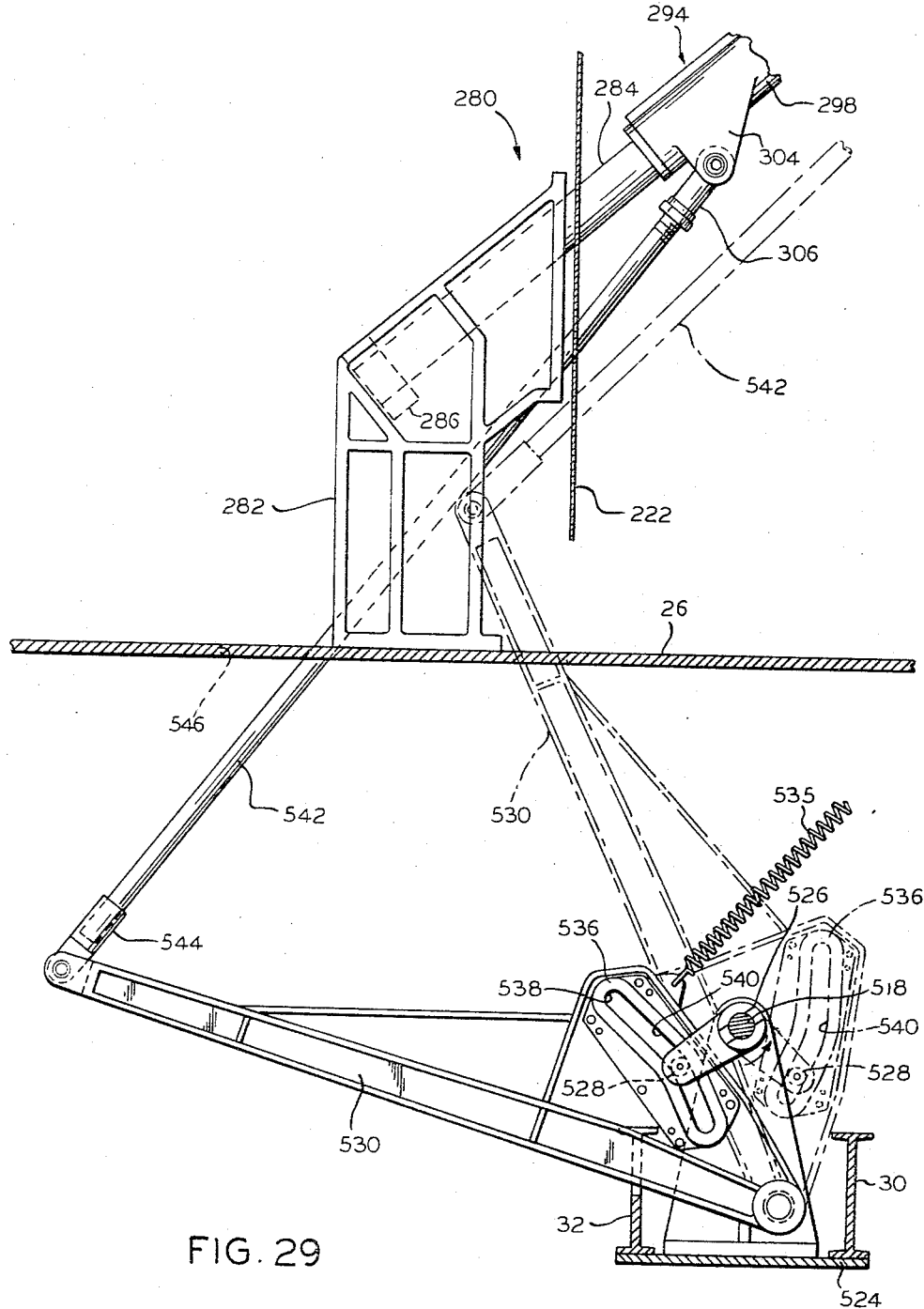

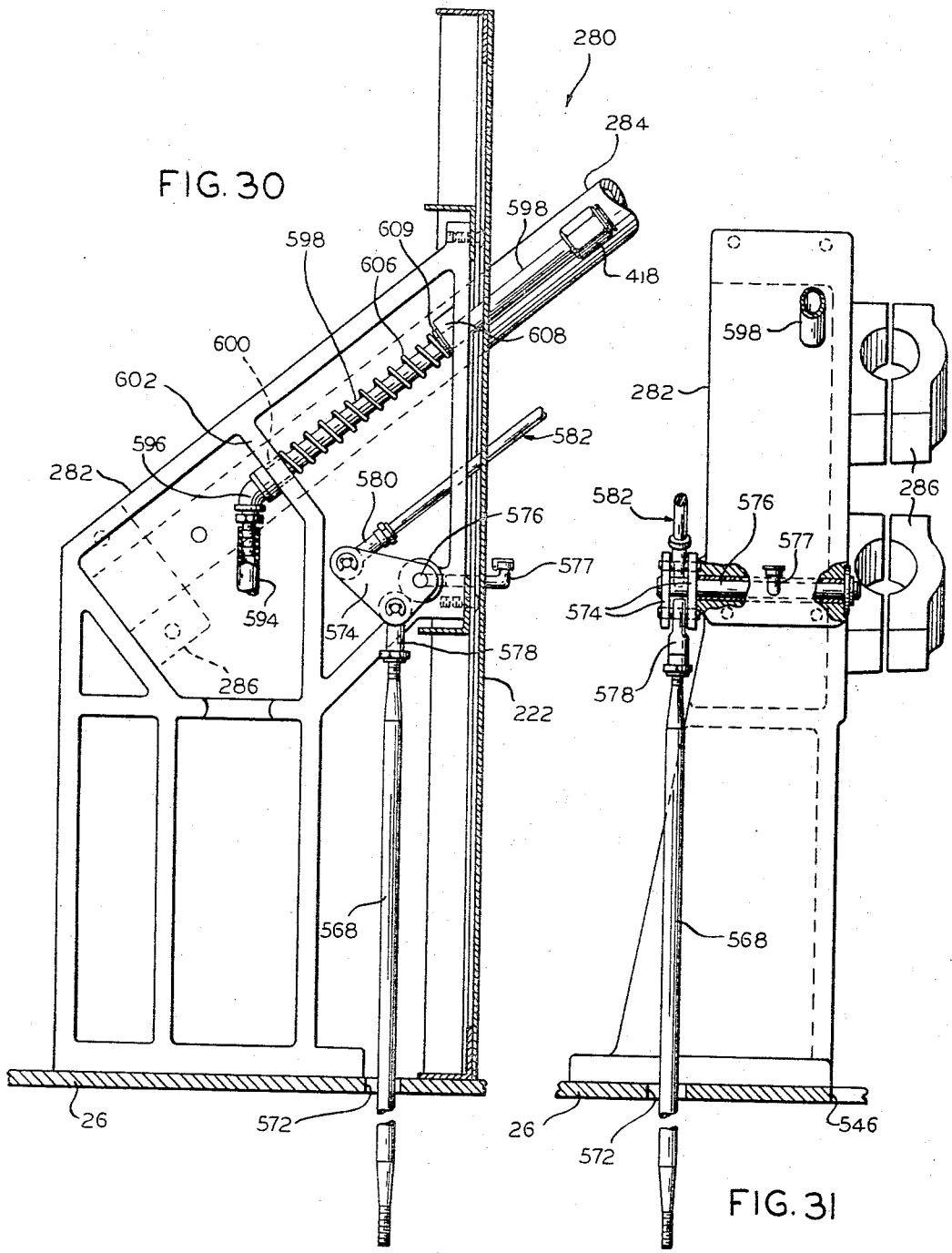

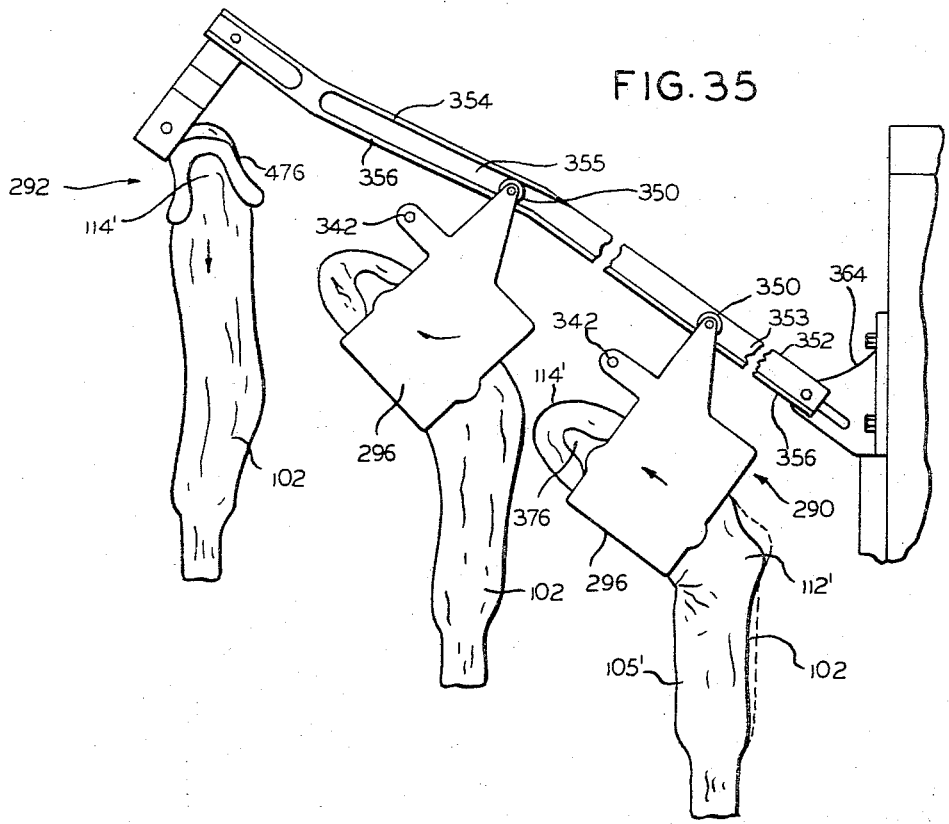
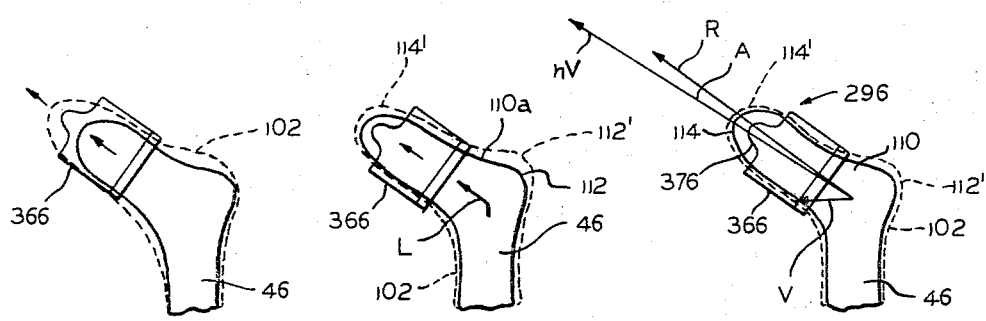
FIG.34  FIG.33  FIG.32

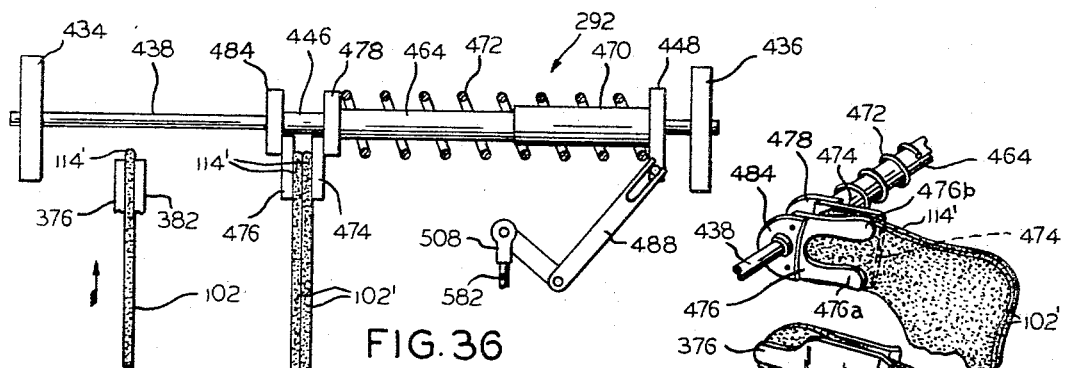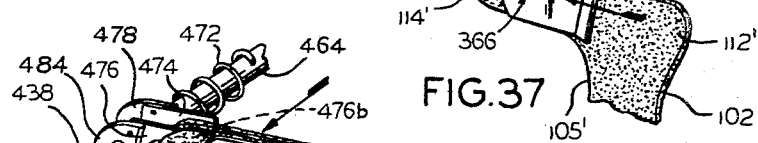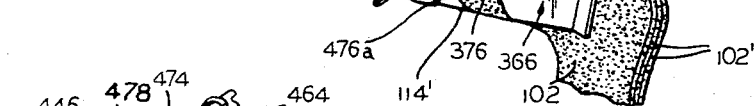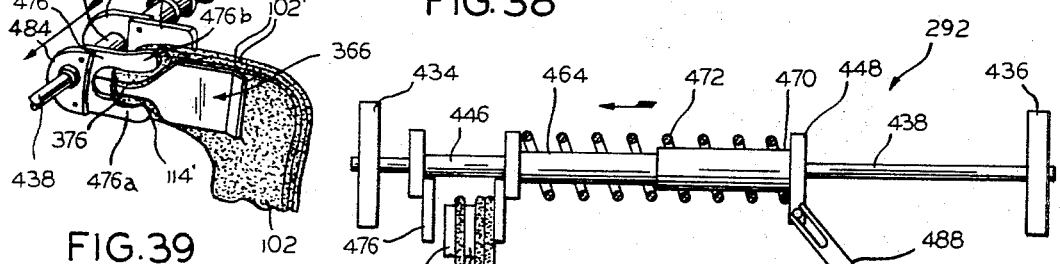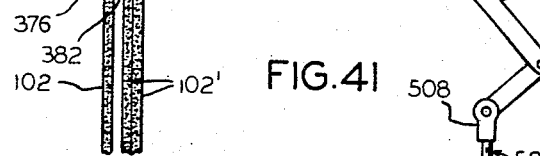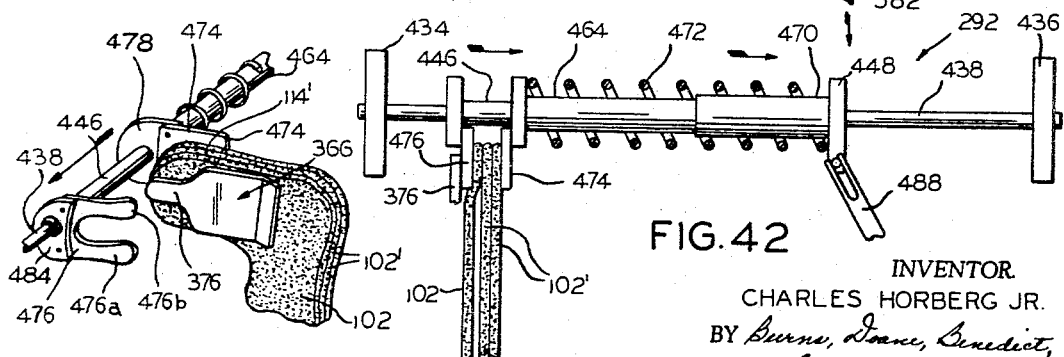

United States Patent Office 3,333,748
Patented Aug. 1, 1967

3,333,748
HOSIERY PROCESSING MACHINERY
AND APPARATUS
Charles Horberg, Jr., Chicago, Ill., assignor to Paramount Textile Machinery Co., Kankakee, Ill., a corporation of Illinois
Original application Feb. 15, 1963, Ser. No. 258,795.
Divided and this application Jan. 4, 1965, Ser. No. 423,277
8 Claims. (Cl. 223—76)

This invention relates to machines for processing hosiery. More particularly, the invention relates to a new and improved semiautomatic machine adapted for transporting hosiery on forms through a processing zone, processing the hosiery in such zone, and thereafter removing the hosiery from the forms and collecting the hosiery. The invention further relates to new and improved handling and processing apparatus useful in hosiery processing machinery, including apparatus for transporting hosiery, drying apparatus, apparatus for removing hosiery from hosiery forms, and apparatus for transferring and for collecting hosiery.

This application is a division of my co-pending application Ser. No. 258,795, filed Feb. 15, 1963.

In the course of hosiery manufacturing and finishing operations, the hosiery articles may be placed on forms or "boarded," and then subjected to a processing operation. One such operation, similarly referred to as "boarding," is a drying operation conducted in a controlled atmosphere, wherein a damp or wet stocking is dried in its proper shape on the form. In the past, this operation has been preceded by two successive operations for reducing the quantity of liquid present in the hosiery, namely, extraction, and partial drying in bulk or "tumble drying." Another processing operation which may be conducted with the hosiery on forms is "setting," wherein the hosiery is subjected to steam or other controlled atmosphere to "set" the hosiery to proper shape, as in the case of nylon stockings.

The foregoing and similar operations in the past have involved considerable manual labor. In operations where semiautomatic apparatus has been employed, a number of disadvantages have been experienced, and there is a substantial need for improvements. Among the deficiencies which have existed are the complex and cumbersome nature of the apparatus, and lack of durability, with resulting operational and maintenance problems. Limitations have existed in the type and quality of hosiery which can be handled with stripping and collecting apparatus. Operation has involved hazards and discomfort to the operator, inconvenience, and a high noise level. Where drying apparatus has been used, the heat efficiency and drying capacity have not been as high as desired.

An important object of the present invention is to overcome these and other prior disadvantages and to provide improvements in hosiery processing machines, handling and processing apparatus, and methods of handling and processing hosiery.

Another object is to provide a machine, and transport, stripping, collecting and drying apparatus adapted for use therein which are outstandingly simple and reliable in construction and operation, and are strong and durable, requiring but a minimum of maintenance.

An additional object is to provide very versatile machinery and apparatus of the type described, and particularly, which may be employed in processing fine grades of hosiery as well as heavier grades.

A further object is to achieve substantial improvements in working conditions and efficiency by providing safe, quiet, convenient, and trouble-free machinery and apparatus.

Another object is to provide machinery and apparatus adapted for line operation in a hosiery mill.

Yet another object is to provide transport apparatus accomplishing the foregoing objects, and which provides exceptionally smooth, reliable, and convenient automatic operation. The transport apparatus is adapted for moving hosiery forms from one operating zone or station to the next, in accurately timed movement, while compactly grouping the hosiery forms during processing of the hosiery. The transport apparatus also is useful for performing other operations and may be employed in conjunction with various types of apparatus.

A further object is to provide a hosiery stripper assembly for removing hosiery from hosiery forms and collecting the hosiery, automatically following a processing operation.

An additional object is to provide hosiery stripping apparatus which provides smooth, rapid removal of fine as well as heavier hosiery from hosiery forms without distortion or damage, and which is adapted to operate automatically in accurately timed relationship to hosiery transport apparatus.

A further object is to provide stripping apparatus of the foregoing character which is adapted for removing hosiery from moving forms, and which then presents the removed hosiery articles in a manner facilitating removal of the articles therefrom and collection of the articles in a desired manner.

A still further object is to provide fluid pressure actuated stripping apparatus, and also, to provide novel means for pressurizing and depressurizing the apparatus.

Another object is to provide hosiery collecting apparatus which furnishes safe and reliable removal of hosiery articles from a stripper or the like, and collects the articles in even groups and ready for succeeding operations, all without distorting or damaging the hosiery. The collecting apparatus is also useful for transferring articles thereto from other apparatus.

An additional object is to provide collecting apparatus of the foregoing character which is adapted to operate automatically in accurately timed relationship to hosiery stripping apparatus, and especially, with both types of apparatus operating synchronously with transport apparatus.

A further object is to provide drying apparatus having high heat efficiency and drying capacity, thereby reducing power requirements and improving the quality of drying.

A still further object is to provide drying apparatus which when employed in a boarding machine or the like, eliminates the prior tumble drying operation.

These and other objects, advantages, and functions of the invention will be apparent on reference to the specification and to the attached drawings illustrating preferred embodiments of the invention, wherein like parts are identified by like reference symbols in each of the views, and wherein:

FIG. 3 is an assembly drawing of the machine in horizontal sectional view, taken substantially on line 3—3 of FIGS. 2 and 16 and with parts removed and other parts broken away, illustrating particularly the transport apparatus and its relationship to other structures;

FIG. 6 is an enlarged fragmentary plan view of a left hand section of the transport apparatus as viewed in FIG. 3;

FIG. 7 is an enlarged sectional and elevational view taken substantially on line 7—7 of FIGS. 3 and 6;

FIG. 8 is an enlarged sectional view taken on line 8—8 of FIG. 3;

FIG. 9 is an enlarged fragmentary plan view of a right hand section of the transport apparatus as viewed in FIG 3;

FIG. 10 is a sectional and elevational view taken substantially on line 10—10 of FIG. 9;

FIG. 11 is an enlarged plan and partly sectional view of part of the conveyor in the transport apparatus and mounting means for a hosiery form on a link of the conveyor, and also illustrating the end of a hosiery form mounted thereon;

FIG. 12 is a side elevational view thereof, with parts broken away and in section, taken on line 12—12 of FIG. 11;

FIG. 13 is a sectional and elevational view taken on line 13—13 of FIG. 11;

FIG. 14 is an enlarged elevational and sectional view of the interior of the motor compartment, illustrating the drive apparatus and connections to the transport, stripper, and collector apparatus;

FIG. 15 is a sectional and elevational view taken substantially along lines 15—15 of FIG. 14, illustrating connections to the collector, and a valve regulating the supply of compressed air for operating the stripper head;

FIG. 18 is an enlarged side and rear perspective view of part of the stripper assembly as seen looking upwardly, including the stripper and the collector, and illustrating successive positions of the stripper in solid and phantom lines, respectively, with the stripper shown in phantom lines in its stripping position at a hosiery form;

FIG. 19 is an enlarged cross-sectional view of the stripper, taken on line 19—19 of FIGS. 18 and 22;

FIG. 20 is an enlarged top plan view, with parts broken away and in section, of the stripper and the collector, slightly separated from their transfer positions of FIG. 22;

FIG. 21 is an enlarged elevational and sectional view of a torque bar and a guide roller unit on the stripper engaging the bar, taken on line 21—21 of FIG. 20 and with a part broken away and in section;

FIG. 22 is an enlarged side elevational and sectional view of the stripper and the collector, with parts broken away, showing the units together in their transfer positions;

FIG. 23 is a sectional view of the stripper, taken on lines 23—23 of FIG. 22;

FIG. 24 is an enlarged side elevational view with parts broken away and in section, showing the reverse sides of the stripper and the collector, with respect to those shown in FIG. 22;

FIGS. 25–27 are, respectively, sectional views of the collector taken substantially along the lines 25—25, 26—26 and 27—27 of FIG. 20;

FIG. 28 is an enlarged fragmentary elevational and partly sectional view of an air supply valve on the stripper and an air chuck, as they come together to supply compressed air to the stripper;

FIG. 29 is a side elevational and sectional view illustrating two positions of the stripper drive connections in solid and phantom lines, respectively, and showing the stripper and collector support associated therewith, taken substantially along lines 29—29 of FIG. 14;

FIG. 30 is a similar view of the stripper and collector support on a larger scale, and illustrating the collector drive connections and compressed air supply means for the stripper including the air chuck supported thereby;

FIG. 31 is a front elevational view of the stripper and collector support and collector drive connections, with parts broken away and in section;

FIGS. 32–34 are sequential schematic views illustrating the operation of the stripper in removing a hosiery article from a hosiery form;

FIG. 35 is a schematic view showing, from right to left, three successive positions of the hosiery article following its removal from a form, in the first two of which it is clamped by the stripper, and in the last of which it is clamped by the collector;

FIG. 36 is a schematic elevational view of the collector holding hosiery articles, illustrating its initial position preparatory to transferring an additional hosiery article thereto from the stripper;

FIG. 37 is a schematic fragmentary perspective view of collector and stripper parts in their positions illustrated in FIG. 36;

FIGS. 38–40 are schematic views like FIG. 37, illustrating successive positions of the parts during the transfer operation;

FIG. 41 is a schematic view like FIG. 36 of the parts in their positions illustrated in FIG. 40; and FIG. 42 is a like view illustrating the succeeding positions of the parts, wherein the hosiery article is transferred to the collector.

Figure 1:
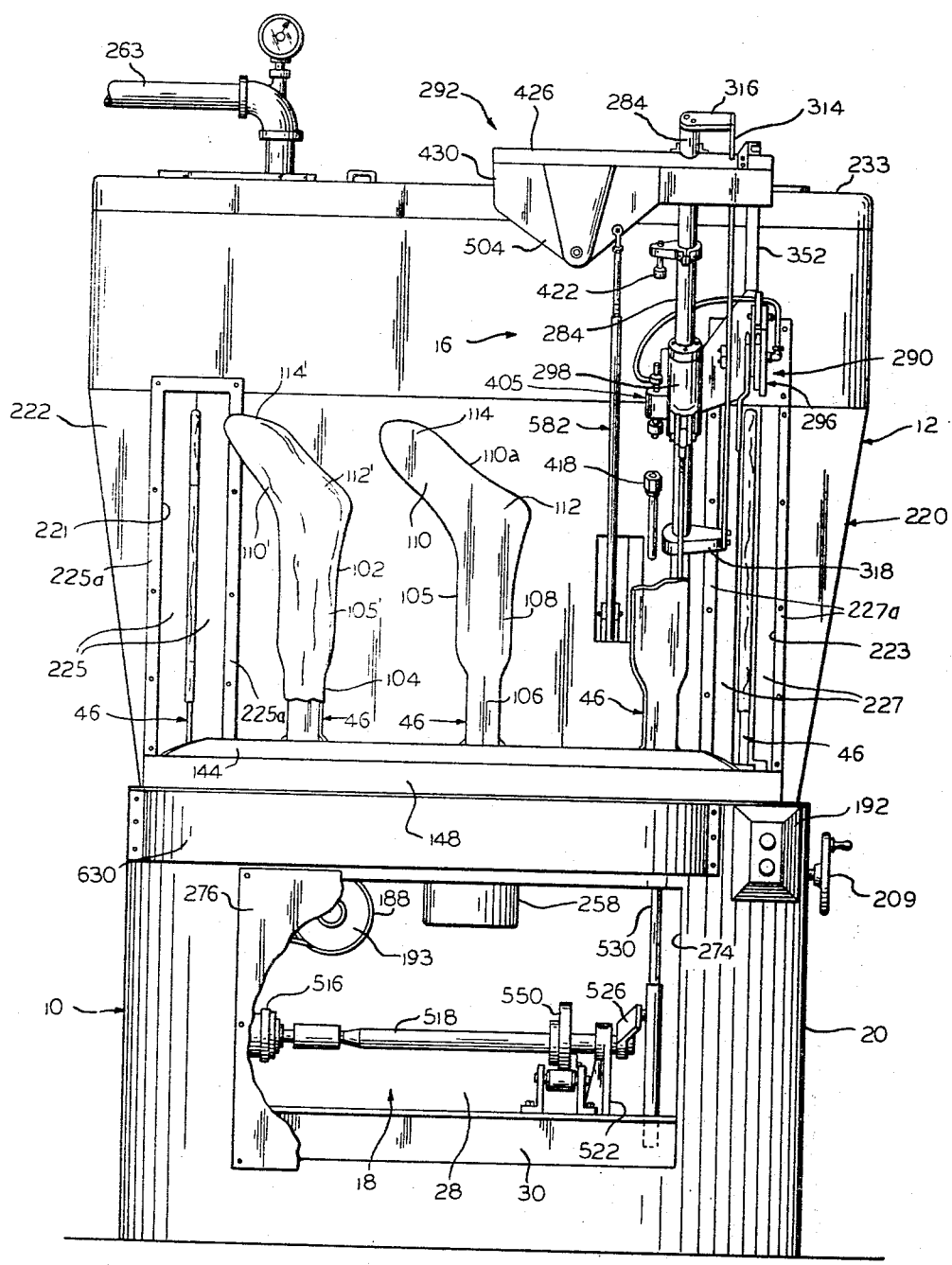
FIGURE 1 is a front side elevational view of a hosiery boarding machine according to the invention, with a base door panel broken away to reveal the interior of the motor compartment.
Figure 2:
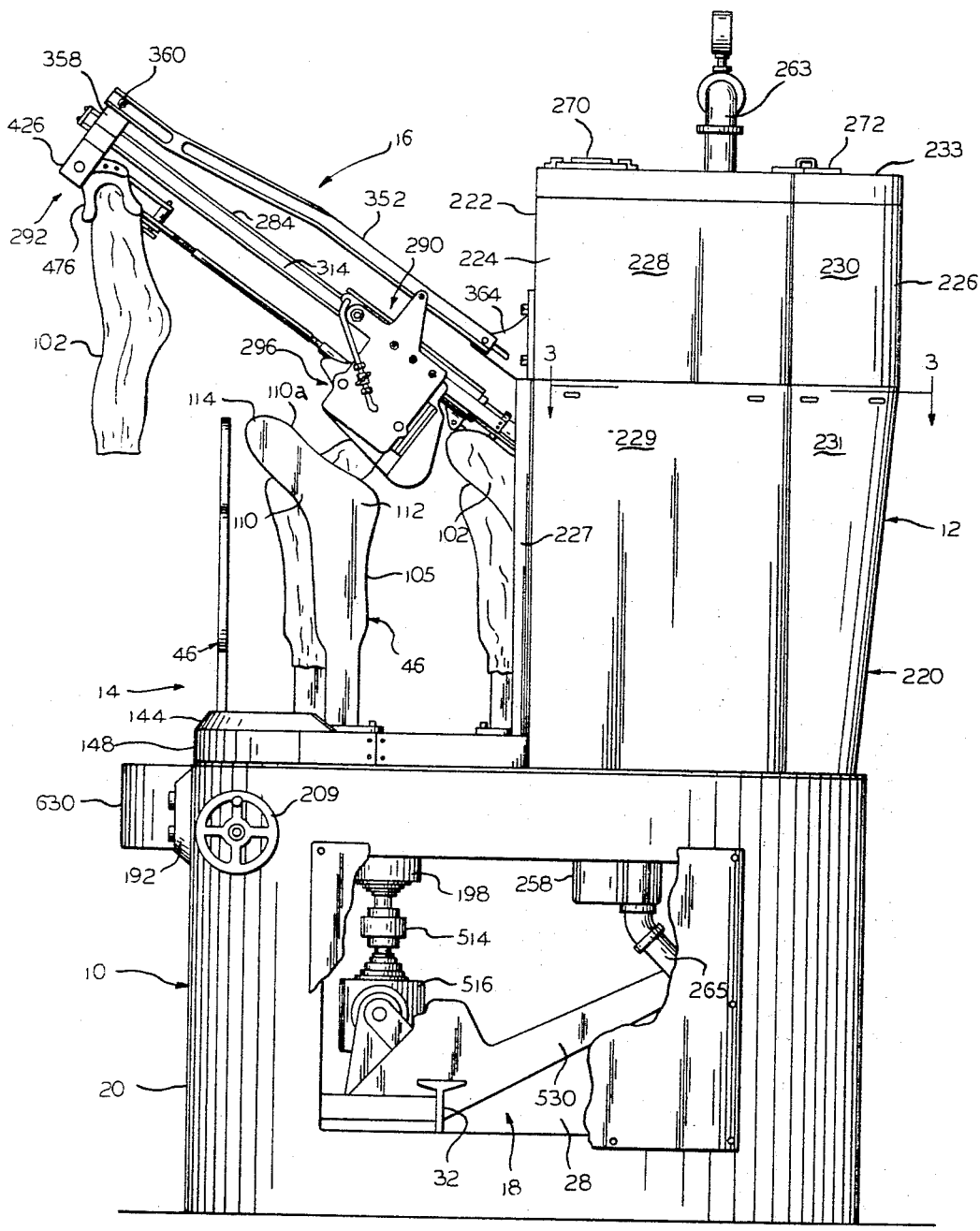
FIG. 2 is an end elevational view thereof, with another door panel broken away to provide an end view of structure in the motor compartment.

Referring to the drawings, a preferred embodiment of a hosiery boarding machine is illustrated in FIGS. 1–3. The machine includes a base 10, a processing or drying assembly 12, a transport assembly 14, a stripper assembly 16, and a drive assembly 18. Hosiery articles to be dried are boarded on hosiery forms constituting components of the transport assembly, and are conveyed to the drying assembly, where they are dried in proper shape on the forms. The dried articles are conveyed to the stripper assembly, where they are stripped from the forms and collected in a group of articles. The drive assembly is drivingly connected to the transport assembly and to the stripper assembly for operating them synchronously in accurately timed cooperative relationship. The machine may be operated continuously to dry, strip, and collect the hosiery.

Figure 16:
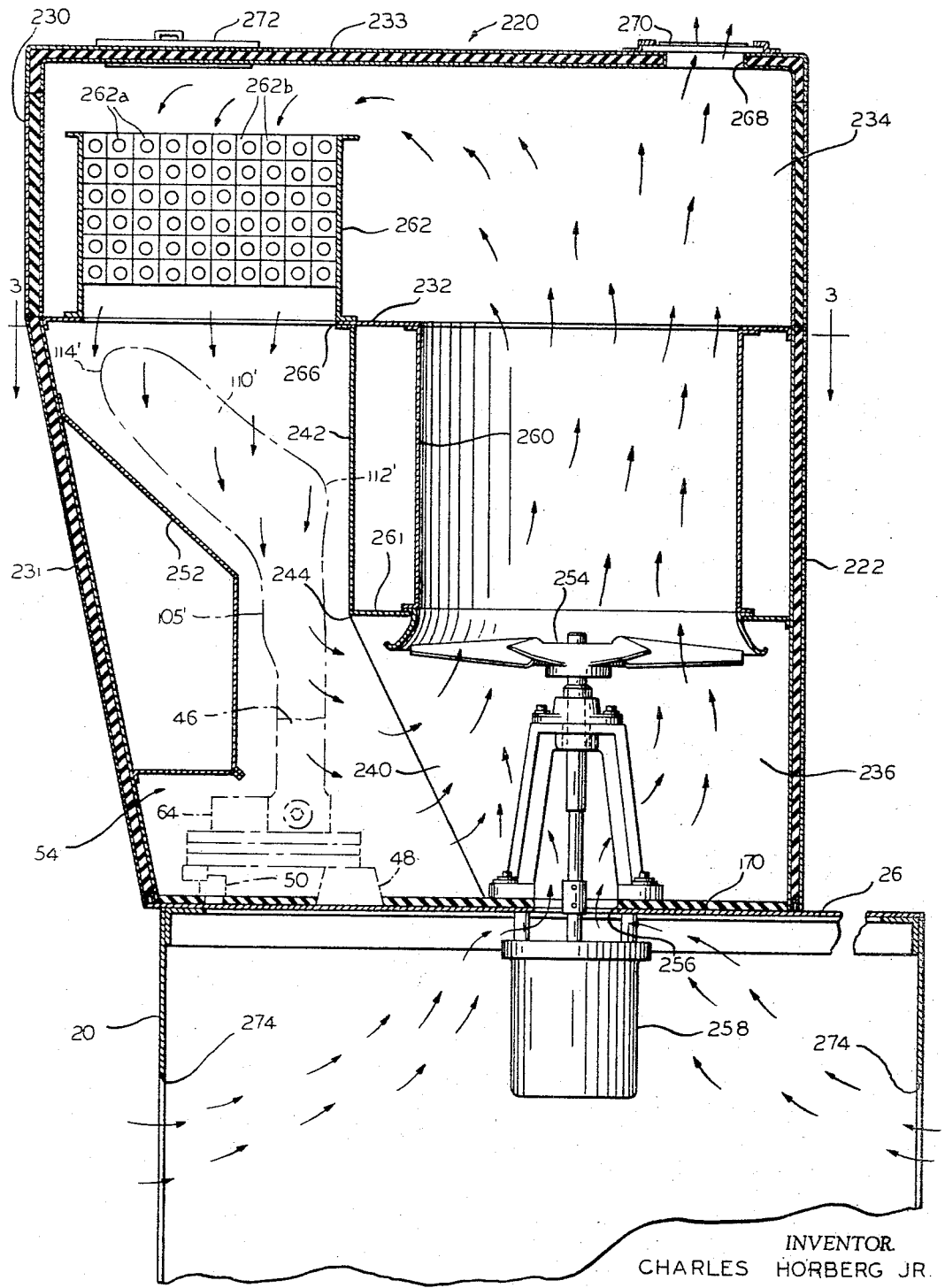
FIG. 16 is an enlarged vertical sectional view of the drying cabinet, with a broken line representation of transport apparatus therein, illustrating the air flow in the cabinet.
Figure 17:
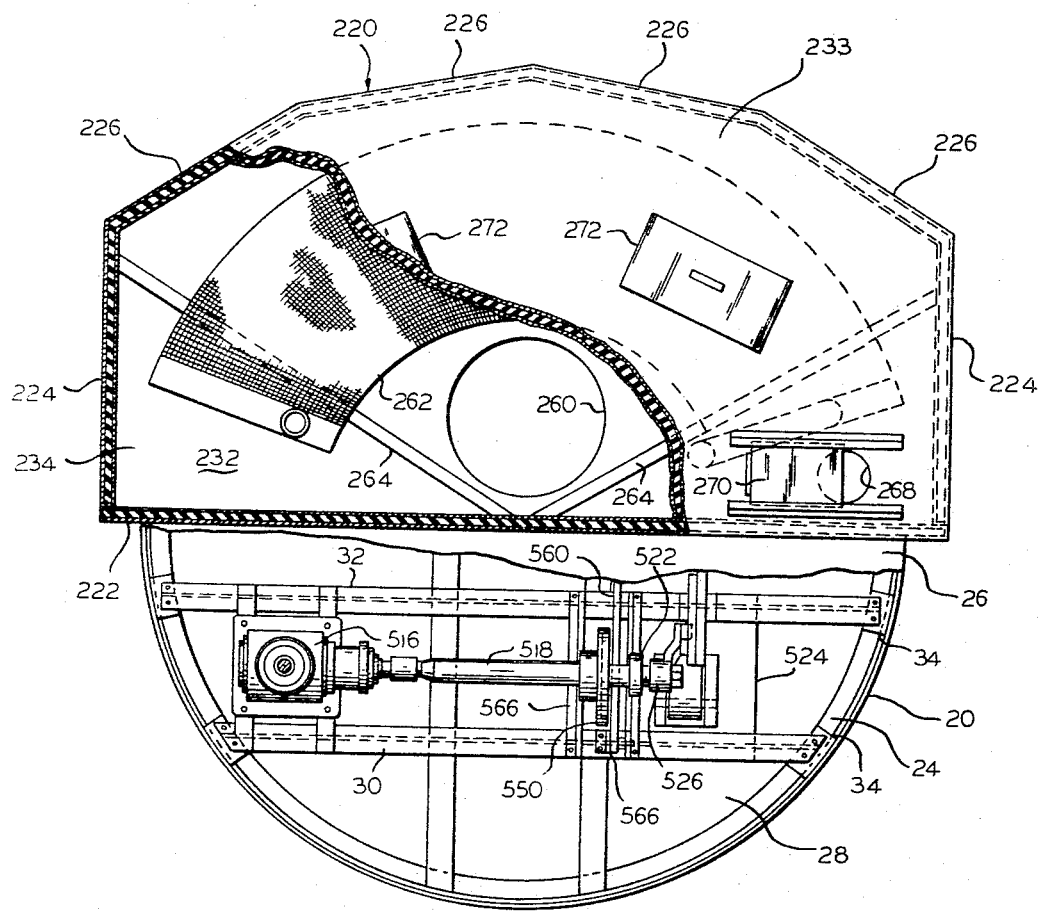
FIG. 17 is a top plan view of the machine with parts removed, and with the roof of the drying cabinet and the platform surmounting the base of the machine broken away, to reveal the interior of the cabinet and the lower drive apparatus and connections in the motor compartment.

Referring also to FIGS. 14 and 16, the base 10 is constructed of an upstanding circular wall 20, upper and lower circular angle members 22 and 24 extending around the inner periphery of the wall and secured thereto, and a horizontal platform 26 secured on the upper angle member. The side wall and the platform define a motor compartment 28 in the base that provides a housing for the drive assembly 18. The drive assembly is in part mounted on the under surface of the platform 26, and in part mounted on lower cross beams such as indicated at 30 and 32. The crossbeams are supported on ledge members 34, which are mounted on the lower angle member 24. The base is seated on bars 36 in spaced relation above a suitable foundation, as indicated by the floor line 38. The bars are supported by leveling screws 40 in threaded engagement therewith. Bolts 42 extend through the leveling screws into the foundation to secure the machine in place. The machine is very compact, and it may be installed in this manner in any desired location.

*Transport assembly*

Referring to FIGS. 1–13, the transport assembly 14 includes an endless link conveyor 44 and a plurality of hosiery forms 46 mounted thereon. As seen in FIG. 3, the transport assembly also includes a primary conveyor track 48 defining a closed path of movement for the conveyor, and an arcuate secondary or side conveyor track 50. The primary track includes respective arcuate and linear sections 48a and 48b intersecting at front and rear corners 48c and 48d. Both of the tracks are mounted on the platform 26 of the base 10. The conveyor travels on the tracks around the platform, and it moves from one zone to the next of successive boarding, processing or drying, and stripping zones or stations on the base, respectively indicated at 52, 54, and 56.

As seen most clearly in FIGS. 11–13 the conveyor 44 is constructed of alternating longitudinally curved or arcuate upper carrier links 58 and lower connecting links 60. The links are constructed of a plurality of laminations of preferably metal sheet or strip material secured together by welding, riveting or other suitable means. One side or edge of each link, which corresponds to the inner side of the conveyor 44, is notched transversely to form a row of integral gear teeth 62 thereon. The gear teeth provide rack gear means on the links for driving the conveyor. The gear teeth are uniformly spaced and arranged in regular succession from one link to the next around a circular arc, when the adjoining arcuate links are arranged so that the respective axes of curvature coincide.

A hosiery form mounting block 64 is secured on the upper surface of each carrier link 58 by screws 67. The block includes an elongated base 66 having a rectangular cross section and rounded ends. Opposite sides 68 and 70 of the base are disposed inwardly of the adjacent margins of the link, and they extend upwardly from the link in spaced parallel planes. An elongated flange plate 72 is integral with the base along one side 70 thereof, and extends normally vertically from the normally horizontal flat upper surface 74 of the base. A transverse threaded mounting opening 76 is provided in the flange plate, and it is disposed towards one end of the plate. An alternate mounting opening 76' is disposed towards the opposite end of the plate. Three locater pins 77 extend from the inner side of the flange plate, being disposed on either side of each mounting opening.

The links 58 and 60 are pivotally connected together at their opposite ends by pivot pins 78 and 80 which pass through corresponding openings in the links and the mounting blocks 64. The pivot pins are press fitted into the carrier links 58 and the mounting block bases 66 for rigidity, and have a running fit in the connecting links 60 for pivotal movement. The gear teeth 62 extend from one pivotal axis to the other on each link (see FIG. 11), providing a regular succession of the teeth from one link to the next as noted above.

Support rollers 82 and 82' are rollably mounted on the respective pivot pins beneath the connecting links. A guide roller 84 is mounted below the support roller 82' on the pivot pin 80 at the normally trailing end of each carrier link 58. Upper and lower retaining split rings 86 and 88 and an intermediate split ring 90 beneath the connecting link 60 serve to maintain desired clearances for the links and rollers in their rotatable assembled positions on the pivot pin 80. Washers 92 and 94 are disposed on opposite surfaces of the carrier link and block assembly, and washers 96 and 98 are disposed on opposite sides of the assembled rollers 82' and 84 on the pivot pin 80. Corresponding rings and washers serve to retain and separate the link ends and the lead roller 82 mounted on the pivot pin 78 at the opposite or normally leading end of the carrier link 58.

A hosiery form 46 is mounted in upstanding inverted position on the mounting block 64 on each carrier link 58. As seen in FIGS. 1 and 2, the form is constructed in the outline of a stocking, from a solid flat metal plate or the like, desirably constructed of aluminum. The particular form illustrated is adapted for processing socks 102 having constricted tops 104. The form extends vertically upwardly from the conveyor 44. The form includes a leg section 105 composed of a relatively narrow end 106 which widens into a shank 108. The leg section is integral with a foot section 110 having a sole 110a. The foot section also includes a heel portion 112 and a toe portion 114, and it otherwise conforms to the shape in which a stocking is to be dried so as to fit properly on the wearer's foot. For convenience, the corresponding portions of the hose 102 are identified by like prime numerals. Substantially the entire periphery of the form is provided with a double bevel 116 (FIGS. 12 and 13) for creasing the hose.

The form 46 is removably secured in end abutting relation on the upper surface 74 of the mounting block 64. For this purpose, the form end 106 is provided with a central longitudinal slot 118 extending upwardly from the lower margin, and with a locating opening 123 on either side of the slot. The form is mounted on the inner surface of the flange plate 72, with the locater pins 77 received in the locating openings 123. A washer 120 is disposed on the opposite side of the form, and a screw 122 extends through the washer and the form slot 118, into threaded engagement in the rear mounting opening 76 of the flange plate. Alternatively, it may be desirable in certain instances to mount the form with the slot 118 registering with the alternate mounting opening 76', thus shifting the form forwardly.

The forms are mounted on the conveyor 44 in this manner so that they are arranged in a file of spaced apart forms facing in the same direction when the conveyor links are disposed with the mounting blocks 64 in alignment, as seen in FIGS. 3 and 9. When the links are arranged so that their axes of curvature coincide, the forms extend tangentially of the conveyor, as seen in FIGS. 3 and 6. The foot section 110 of each form extends longitudinally of the carrier link and inclines upwardly and forwardly from the vertical leg section 105 of the form, with the sole 110a of the foot facing upwardly.

The arcuate section 48a of the primary conveyor track 48 defines a circular path in the boarding zone 52 and in the drying zone 54. The linear section 48b defines a straight run path from front to rear corresponding to a chord of the circle, extending from the drying zone through the stripping zone 56, as seen in FIG. 3. Referring to FIG. 8 in particular, and also to FIGS. 7 and 10, the primary track forms an upper channel 124 in which the support rollers 82 and 82' travel and are supported. Shoulders 126 at the base of the channel provide supporting surfaces and slideways for the support rollers. The channel is slightly wider than the rollers, and the rollers bear on one of inner and outer side walls 128 and 130 thereof. Which wall is contacted by a roller depends upon the location of the roller on the track, and in FIG. 10, the roller 82 bears on the inner wall 128. Both support rollers 82 and 82' travel on the primary track 48 in the boarding and stripping zones 52 and 56, to extend the links 58 and 60 in a file thereof and cause them to move generally longitudinally along the track in such zone.

The primary conveyor track 48 also forms a lower channel 132 having inner and outer side walls 134 and 136 and a centrally recessed base 138 forming shoulders with the side walls. The lower channel receives the guide rollers 84 for guiding the conveyor links in folding and unfolding operations, as subsequently described, and to provide additional stability for the conveying apparatus. As seen in FIG. 10, the guide rollers are spaced slightly above the shoulders on the base 138.

As seen most clearly in FIGS. 3, 6 and 8, a retaining strip 140 is mounted on the outer wall of the primary conveyor track 48 in the front quadrant of the arcuate section 48a. The strip extends over the upper channel 124, to retain the rollers in the track. Flexible guard strips 144 and 146 are secured adjacent to opposite sides of the track in the boarding zone, as illustrated fragmentarily in FIG. 8 and as seen in FIGS. 1 and 2. The guard strips may be constructed of resilient material such as neoprene. The guard strips serve to cover and enclose the conveyor while the leg sections 105 of the hosiery forms 46 move between the strips, to protect the operator and prevent entrance of foreign material and objects. The guard strips are secured to a casing 148 enclosing the track 48.

Referring to FIGS. 3, 9 and 10, two guide bars 150 are mounted in spaced parallel relation on the straight run section 48b of the primary conveyor track 48, being raised therefrom by spacers 152 and secured on the track by screws 154. The guide bars have parallel inner surfaces which slidably engage the opposite sides 68 and 70 (FIG. 11) of the mounting block 64, thus insuring a straight path of movement of the hosiery forms 46 through the stripping zone 56. At the same time, the guide bars extend over the carrier links 58 and serve to retain the conveyor on the track during the stripping operation. The base 138 of the primary conveyor track is provided with a cleanout opening 156 just beyond the guide bars 150, through which falls any lint moved along the track by the conveyor.

Referring to FIGS. 3, 5, 6, and 9, the secondary or side conveyor track 50 is a bar formed in the arc of a circle concentric with and having a greater diameter than the arcuate section 48a of the primary conveyor track. The bar includes an outer peripheral ledge 158 on which the leading support rollers 82 are slidably and rollably seated. The bar is secured to the platform 26 by means of screws 168.

Figure 4:
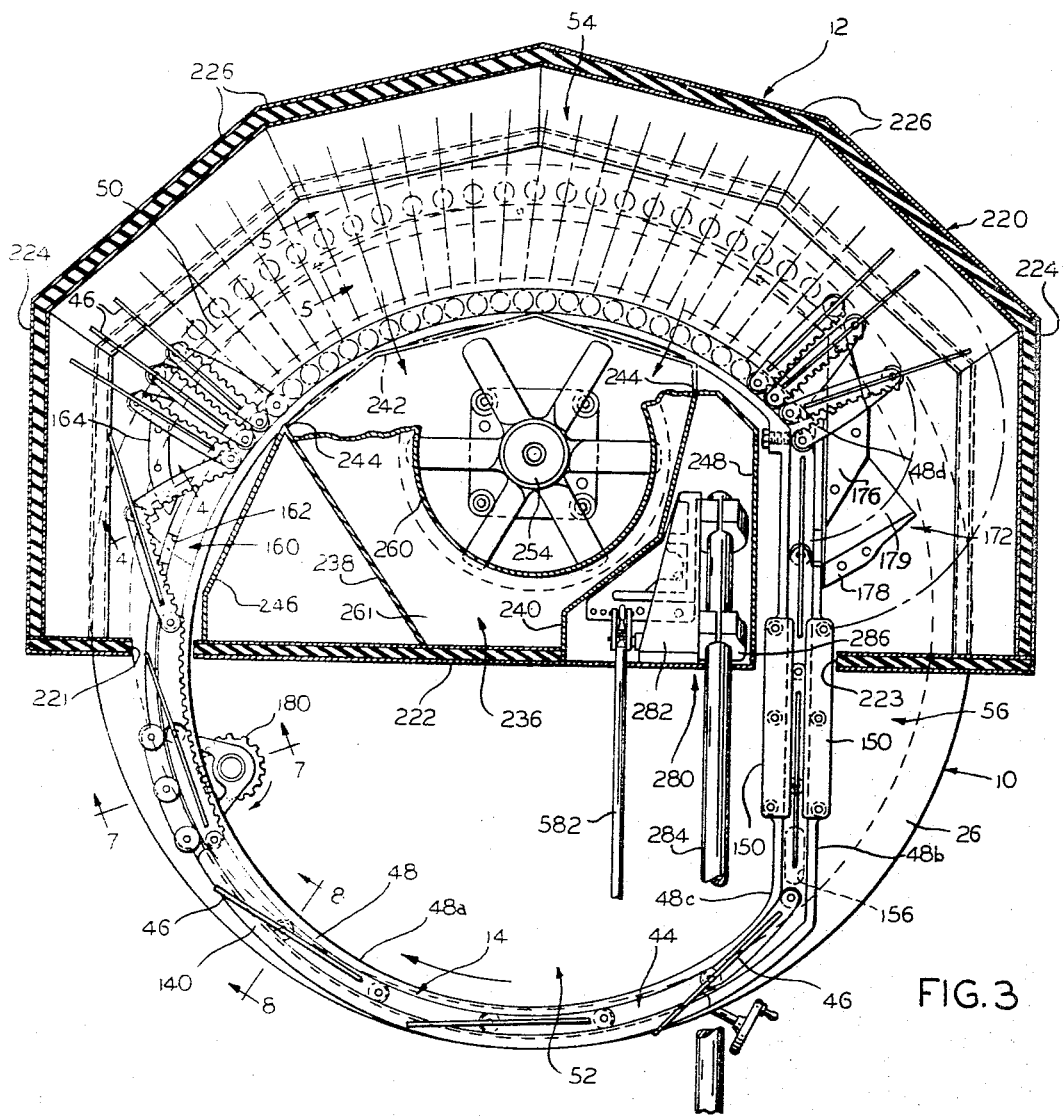
FIG. 4 is an enlarged fragmentary sectional view of parts of the transport apparatus, taken on line 4—4 of FIG. 3.
Figure 5:
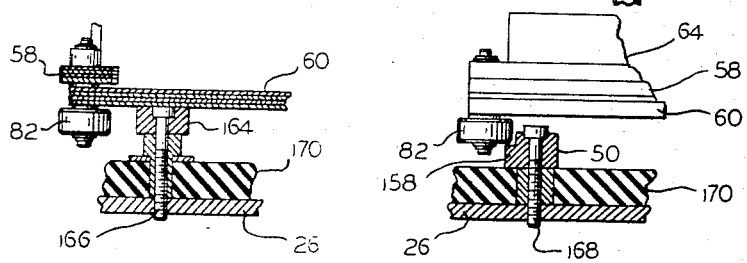
FIG. 5 is an enlarged fragmentary sectional view of parts of the transport apparatus, taken on line 5—5 of FIG. 3.

A folding switch construction 160 is shown in detail in FIGS. 4 and 6. The outer wall 130 (FIG. 8) of the upper channel 124 of the primary conveyor track is cut out in the drying zone 54 to provide a gate slot 162 for movement of the lead rollers 82 therethrough. A curved slide bar 164 for the connecting links 60 extends from a position adjacent the rear of the slot to the secondary conveyor track 50. The slide bar is secured to the platform 26 by means of screws 166. A layer of insulation 170 (see also FIG. 16) is interposed between the platform, and the conveyor and slide bars 50 and 164, and it covers the platform in the drying zone 54.

FIGS. 3 and 9 illustrate an unfolding switch construction 172 adjacent to the exit from the drying zone 54. The outer wall 130 of the upper channel in the primary conveyor track is cut away in the straight run section 48b near its inner end, to provide a gate slot 174 for movement of the lead rollers 82 therethrough. A slide bar 176 for the connecting links 60 is mounted on the platform 26 and extends from the rear of the slot to the secondary conveyor track 50. A bumper bar 178 is mounted on the platform adjacent to the front end of the slot. A plate 179 joins the slide and bumper bars, and it supports the base of the pivot pin 78 as the links unfold.

As seen in FIGS. 3, 6 and 7, the conveyor 44 is driven by a spur drive gear 180 in engagement with the drive teeth 62 of the conveyor. The gear is in constant engagement either with a carrier link 58 or a connecting link 60, which engage upper and lower portions of the gear, respectively. Backup rollers 182 are arranged to contact the side of each link opposite to the side engaged by the gear. The drive gear is mounted on a journal block 184 on the inner wall of the primary conveyor track 48, and the rollers are mounted on an enlargement 186 on the outer wall of the track.

*Transport assembly operation*

Referring especially to FIGS. 3, 6, and 9, the drive gear 180 turns in the clockwise direction and continuously drives the conveyor 44 in the same direction when the machine is operating. The force of the drive gear causes the support rollers 82 and 82' to travel on the outer wall 130 (FIG. 7) of the upper track channel 124 at this location. When the lead roller 82 reaches the folding switch gate slot 162, the pushing force causes the roller to break out through the slot to a position externally of the primary track 48. The conveyor folds or buckles at this point, and the preceding connecting link 60 slides on the bar 164 until the lead roller 82 reaches a position on the shoulder 158 of the secondary conveyor track 50. The lead roller follows a curved path as represented by arrows in FIG. 6. The trailing support roller 82' and the subjacent guide roller 84 continue to travel in the primary track beyond the gate slot 162, being retained on the track by the guide roller in the lower channel 132, which is continuous at this location.

The lead rollers 82 move into positions on the secondary track 50 adjacent to the preceding lead rollers, and the trailing rollers 82' move on the primary track into abutting engagement with the preceding trailing rollers. The conveyor is folded in this manner in the drying zone 54, so that the hosiery forms 46 face radially outwardly and are abreast of each other in an arcuate row, forming a compact group in side-by-side relation around the rear of the machine in the drying zone. As each trailing roller 82' contacts the preceding like roller, the folded section of the conveyor is advanced by the drive gear 180, until the next lead roller 82 reaches the slot 162 and breaks out. In this manner, the conveyor links and the forms thereon are advanced intermittently for short distances on the conveyor tracks in the drying zone.

The folded links ultimately reach the unfolding switch construction 172, where the conveyor is unfolded. At this location, the conveyor is under tension imparted thereto by the drive gear 180, and the links are pulled apart. Each lead roller 82 is pulled through the curved path represented by the arrows in FIG. 9, while the trailing roller 82' is separated from the succeeding roller. The connecting link 60 slides on the surface of the bar 176. The lead roller 82 passes through the gate slot 174, and proper entrance to the primary track 48 through the slot is insured by the bumper 178. The links then are pulled in single file on the straight run track section 48b through the stripping zone 56. Upon leaving the straight run section, the links travel in single file in a circular path through the boarding zone 52 to the drive gear 180, and the cycle of movement is repeated.

The transport assembly 14 thus is constructed for driving the conveyor 44 continuously during operation, with the extended sections in the boarding zone 52 and the stripping zone 56 moving continuously, and the folded section in the drying zone 54 moving intermittently. The extended sections provide separated hosiery forms to accommodate boarding and stripping operations. The folded section provides a compact grouping of the forms which results in high drying efficiency, and the forms travel through the drying zone at a reduced rate which affords a suitable period of time for drying during travel through a relatively small zone.

The foregoing construction and operation of the transport assembly represent preferred embodiments of the invention. It will be apparent that various changes and modifications therein may be made within the purview of the invention, for accomplishing the same and other results. Thus, for example, the conveyor links may be linear instead of arcuate, and be driven while moving in a linear path. The conveyor may follow other paths, including various combinations of curved and straight sections, while flexing during its travel therein. The conveyor may be driven at more than one location to produce suitable pushing and pulling forces. Instead of employing an endless conveyor, a plurality of conveyor sections may be used. Such apparatus, in combination with appropriate drive means, may be employed where, for example, it is desired to pressurize or for another reason close off the zone 54 for a processing operation. In such cases, the conveyor may be operated intermittently, with the sections thereof successively moved into and out of such processing zone.

Transport assembly drive mechanism

The drive assembly 18, illustrated in FIG. 14, includes a drive motor 188 movably mounted on a hanger or base 190 secured to the under surface of the platform 26. The motor is operated by the machine operator from a control box 192 (FIGS. 1 and 2) at the front of the machine on the base side wall 20. A variable pitch pulley 193 is mounted on the motor shaft, and has a variable speed V-belt 194 trained thereon. The belt is also trained on a pulley 196 drivingly connected to a top and bottom output speed reducer 198. A shaft section 200 extends upwardly from the speed reducer, through the platform 26 and the journal block 184, and is drivingly connected to the drive gear 180. A shaft section 202 extends downwardly from the speed reducer, for driving other apparatus as subsequently described.

A hand wheel 204 is located outside of the base 10 of the machine. It is connected by coupled adjusting rods 206 and 208 to one of two motor mounting brackets 210. The brackets are slidable on a horizontal slide rod 211 of the hanger 190. One adjusting rod 208 is threaded and engages an internally threaded sleeve 212 secured to the hanger. When the hand wheel 204 is turned, the motor 188 and the pulley 193 thereon are moved to or from the speed reducer pulley 196, to vary the output of the speed reducer 198. In this manner, the rotational speed of the drive shafts 200 and 202 may be varied to vary the rate of travel of the conveyor 44 and, correspondingly, the operating rates of other apparatus connected to the speed reducer.

Processing assembly

The processing or drying assembly 12 includes a drying cabinet or housing 220 mounted on the base 10 and enclosing the drying zone 54, as seen in FIGS. 1, 2, 3, 16, and 17. The cabinet includes front, end and back insulated walls 222, 224, and 226, respectively. The end walls are normal to the front wall, while the end walls and the back walls form obtuse angles around the circular base. The front wall 222 is vertical. Entrance and exit doorways 221 and 223, respectively, are provided on opposite sides of the front wall, and the primary conveyor track 48 extends therethrough. The doorways extend upwardly for a sufficient distance to accommodate passage of the hosiery forms 46 carried by the conveyor 44 on the track. Flexible resilient closure strips 225 and 227 of neoprene or the like are secured in pairs to the front wall 222 on opposite sides of the respective doorways by bars 225a and 227a. The strips extend across the doorways to prevent hot air from leaving the drying cabinet in excessive amounts, while permitting the conveyor and forms to enter and leave the cabinet.

The end and back walls are composed of upper vertical panels and lower inwardly inclined removable panels, as respectively indicated by the numbers 228 and 229 for an end wall 224 and 230 and 231 for a back wall 226 in FIG. 2. The inclination of the lower panels corresponds generally to the disposition of the hosiery forms 46 in the cabinet, as seen in FIG. 16. The drying cabinet encloses substantially one-half of the primary conveyor track 48 and a greater proportion of the top of the base 10, and it encloses the secondary conveyor track 50 and the folding switches 160 and 172, as seen in FIG. 3.

The platform 26 and the insulation 170 thereon constitute the floor of the drying cabinet 220. The cabinet is covered by an insulated roof 233. A horizontal partition 232 forms a plenum chamber 234 at the top of the drying cabinet, which is bounded by the roof 233, the front wall 222, and the upper vertical panels 228 and 230 of the respective end and back walls 224 and 226. As seen most clearly in FIGS. 3 and 16, a fan compartment 236 is located centrally adjacent the front of the cabinet. It is defined by vertical side divider walls 238 and 240, a vertical back divider wall 242, and the front wall 222 of the cabinet. The side walls 238 and 240 extend from the partition 232 to the floor of the cabinet. The back wall 242 extends from the partition 232 for approximately one-half of the distance to the floor, to leave an opening 244 between the drying zone 54 and the fan compartment. The opening as it appears adjacent to the floor of the cabinet is illustrated in FIG. 3 by representing the back wall 242 and part of the side wall 240 only in phantom lines.

Vertical drying zone divider walls 246 and 248 and the back wall 242 of the fan compartment define a roughly semicircular drying compartment extending around the drying cabinet 220 adjacent to the end and back walls thereof. The drying zone divider walls 246 and 248 form dead air spaces with the respective fan compartment side divider walls 238 and 240, and the front wall 222 of the cabinet, on opposite sides of the fan compartment 236 and below the plenum chamber 234. False wall sections 252 (FIG. 16) are joined to the several lower end and back wall panels 229 and 231 of the cabinet, and the sections extend inwardly from the panels and form dead air spaces therewith. The sections correspond generally to the front contour of the hosiery forms 46, and serve as air guides or baffles to direct and accelerate the movement of air over the forms. They extend progressively inwardly to reduce the radial width of the drying compartment, forming a venturi channel with the back divider wall 242 of the fan compartment. The throat of the venturi encloses the leg sections of the hosiery forms, adjacent to the fan compartment opening 244.

Air is circulated in the drying cabinet 220 by a vertically directed fan 254 mounted over an opening 256 in the floor of the fan compartment 236. The fan is driven by a motor 258 suspended from the floor beneath the opening. An air duct 260 in the fan compartment encircles the fan thereabove and is joined to the plenum chamber partition 232. The plenum chamber communicates in this manner with the pressure side of the fan. The plenum chamber is considerably enlarged with respect to the air duct, so that the air flow path is enlarged and the air velocity decreased substantially, A lower horizontal partition 261 bridges the space between the duct and the divider walls 238, 240 and 242, and the front wall 222, to form a dead air space with the upper partition 232.

An arcuate heat exchanger 262 is supported on bars 264 (FIG. 17) in the plenum chamber 234. The exchanger is connected to an overhead steam pipe 263 (FIGS. 1 and 2) extending through the roof 233. A drain pipe 265 (FIG. 2) descends from the exchanger to the base 10. Air exhaust or vent openings 268 (FIGS. 16 and 17) are provided adjacent the front corners of the roof 233. The exhaust is regulated by slide door assemblies 270, which may be adjusted to vary the effective area of the openings. Two cleanout doors 272 are also provided in the roof 233, over the heat exchanger.

The heat exchanger 262 includes steam coils 262a for heating air. Each coil is provided with spaced transverse vertical conductive elements or fins 262b arranged therealong to extend radially of the exchanger. The exchanger is arranged in the flow path from the plenum chamber 234 to the drying zone 54. It is mounted in register with a coextensive discharge opening 266 therebelow in the plenum chamber partition 232. The discharge opening is considerably larger than the crosssection of the air duct 260. The opening is located at the top of the drying zone 54 and is adjacent to the tops (foot sections 110) of the hosiery forms 46 therein. The exchanger thus is directly above and very close to the hosiery forms.

The fan 254 circulates air in the drying cabinet 220 in the manner illustrated by arrows in FIGS. 3 and 16. Make-up air is delivered to the suction side of the fan from the outside through inlet openings 274 in the base wall 20, which register with openings (not shown) in door panels 276 (FIG. 1) mounted over the wall openings. The air drawn through the base wall openings 274 serves to cool the fan motor 258 and the drive motor 188.

Air is moved by the fan through the duct 260 and into the plenum chamber 234, where the air velocity decreases substantially. Moisture is removed from the cabinet by discharging a portion of the circulating air through the exhaust openings 268. The openings also furnish a pressure break which reduces the static head in the plenum chamber. Air passes through the heat exchanger 262 and is heated by the coils 262a and the fins 262b. The air is directed by the fins in parallel vertical streams into the drying zone 54. Owing to the reduction in the static head in the plenum chamber, the drying zone is near atmospheric pressure. Heated air moves downwardly over the hosiery forms 46 and the hose thereon at increasingly greater velocity and lower pressure, drying the hose. The resulting moist air travels to the suction side of the fan.

The described drying apparatus provides very high heat efficiency and drying capacity. The decrease in air velocity and reduction in static head in the plenum chamber 234, as described above, result in relatively low turbulence at the heat exchanger 262. With the heat transfer fins 262b arranged to direct the air downwardly in parallel vertical streams, and with the drying zone 54 under relatively low pressure, air is drawn through the heat exchanger in relatively even non-turbulent flow, resulting in high heat transfer efficiency. The heated air contacts the articles on the hosiery forms substantially immediately on leaving the exchanger. The air continues to flow relatively evenly and with low turbulence under the relatively low pressure, downwardly along the upright hosiery forms. Consequently, very efficient drying is accomplished. As the air streams pick up moisture, they converge to the venturi throat between the false wall sections 252 and the fan compartment wall 242. The air velocity increases and the air pressure decreases, to enhance the drying efficiency at the leg sections 105′ of the articles.

Owing to the improved drying provided in this manner, the hosiery no longer need be subjected to a preceding tumble drying operation. A further advantage is that operator comfort is greatly improved, since hot air is positively discharged at the top of the machine, and little air escapes in the operating area at the front of the machine. The drying apparatus also provides the foregoing advantages when used for drying hosiery supported in other ways, and for drying other textile articles. It will be apparent that various changes may be made in the structure and arrangement of the components of the drying apparatus, both when employing the apparatus in the illustrative manner and when utilizing it in other ways.

*Stripper assembly*

As seen in FIGS. 1 and 2, the stripper assembly 16 is mounted on the base 10, and it extends from within the drying cabinet 220, upwardly and forwardly above the transport assembly 14 on the platform 26. As seen in FIG. 3, and in greater detail in FIGS. 29–31, the stripper assembly includes a stripper and collector support 280. The support is constructed of a block or casting 282, and an upwardly and forwardly inclined slide rod 284 secured on one side of the block by brackets 286. The block is mounted on the platform 26 in the enclosure within the drying cabinet defined by the divider walls 240 and 248, and an uninsulated section of the front wall 222. The slide rod extends through an opening in the front wall, in parallel to the linear primary track section 48b.

The stripper assembly 16 also includes a stripper 290 and a collector 292 mounted on the slide rod 284, as illustrated in FIGS. 1, 2, 18, 20, 22, and 24. The stripper is movable on the slide rod in parallel to the linear track section 48b, from a stripping or pickup position, illustrated in phantom lines in FIG. 18, to a transfer or delivery position illustrated in FIG. 22. The collector is mounted in an adjustable fixed position at the outer end of the slide rod, adjacent to the transfer position of the stripper. The stripper assembly operates to strip a hosiery article 102 from each hosiery form 46 emerging from the drying cabinet on the conveyor 44, transfer the hose to the collector, and collect the hose in a suspended group in the manner illustrated in FIG. 2.

*Stripper*

As seen especially in FIGS. 20 and 22, the stripper 290 includes a movable carriage 294 and a stripping head 296 adjustably and rotatably mounted thereon. The carriage includes a cylinder 298 which is slidably movable on the slide rod 284, and a mounting plate 300 adjustably secured to the cylinder by screws 302 and laterally extending therefrom. A lug 304 extends from the cylinder 298, and a drive link 306 is pivotally mounted thereon. The carriage is prevented from turning about the slide rod 284 by a guide member 308 adjustably mounted on the plate 300 by means of screws 310 and depending from the plate. The guide member includes a pair of vertically spaced rollers 312 (FIG. 21) which engage the opposite edges of a torque bar 314. The bar is secured to the outer end of the slide rod 284 in spaced parallel relation by means of a bracket 316, as seen in FIGS. 1 and 20. The inner end of the bar is secured to the slide rod by a bracket 318 mounted on the rod in the vicinity of the cabinet front wall 222, as seen in FIG. 1.

In this manner, the stripper 290 is mounted for reciprocal sliding movement on the slide rod 284 to and from each successive hosiery form 46 on the conveyor, and between the form and the collector 292. The cylinder 298 is provided with internal bearings 320 (FIG. 24), wipers 322 and annular retainer discs 323, and it is lubricated internally by means of a grease fitting 324 (FIG. 20). The stripper operates continuously with very little wear and requiring only minimal maintenance.

The stripping head 296 includes a supporting plate 326, a mounting bar and spacer 328, and a back plate 330. The plates are secured together in spaced generally parallel relation with the bar between them, by means of screws 332 and 333 (FIG. 23). The plates are also parallel to the slide rod 284. As seen especially in FIG. 22, the stripping head is mounted for rotation in planes parallel to the slide rod. It is mounted at the front of the carriage 294 on an adjusting bar 334 having a lug 336 depending therefrom. The mounting bar 328 is rabbeted across its front end to provide a groove 338 receiving the lug, with a finger portion 340 of the supporting plate 326 on the opposite side of the lug. The bar and the plate are joined to the lug by a pivot pin 342. The adjusting bar 334 is adjustably secured on the mounting plate 300 by screws 344 which extend through elongated slots 346 in the plate. The slots extend in parallel to the slide rod 284, to provide longitudinal adjustment of the stripping head relative thereto.

The stripping head is guided and turned on its pivot 342 during travel of the stripper on the slide rod 284, by means of an upwardly extending level 348 integral with the supporting plate 326. A roller 350 is mounted at the upper end of the lever, and it functions as a cam follower. The roller engages a guide bar 352 (FIG. 18) above the stripper. The guide bar includes an upwardly and forwardly inclined rear section 353 which is parallel to the slide rod 284 in each dimension. The bar also includes an integral front section which is inclined downwardly and forwardly from the rear section, towards the front end of the slide rod, and which otherwise extends parallel to the slide rod axis. The roller travels on upper and lower tracks 354 and 356 extending laterally of the guide bar. The front end of the guide bar is longitudinally adjustably secured to a bracket 358 by a screw 360 (see FIG.

22), and the bracket is secured to the collector 292 by screws 362. As seen in FIG. 2, the inner end of the guide bar 352 is longitudinally adjustably secured to a bracket 364 mounted on the front wall 222. The foregoing structure for guiding and turning the stripper head 296 causes it to assume one position for stripping a stocking from a hosiery form as represented in phantom lines in FIG. 18, and another position for transferring the stocking to the collector as illustrated in FIG. 22, the latter position representing a clockwise rotation in vertical planes with respect to the former position.

As seen particularly in FIGS. 18, 19, 22 and 23, movable and stationary clamps or gripping jaws 366 and 368, respectively, are mounted in normally open spaced essentially parallel relation between and paralleling the supporting plate 326 and the back plate 330. The movable or pressure clamp 366 includes a mounting plate 370, a pressure plate 372 secured thereto, and a fabric facing 374 of mohair or the like secured over the surface of the pressure plate. A nose portion 376 is formed on the leading edge of the pressure plate and the fabric thereon, as seen in FIGS. 18 and 22.

The stationary clamp 368 includes a gripper plate 378 secured to the back plate 330 by fasteners 379, and a fabric facing 380 secured over the surface of the gripper plate. The outlines of the gripper plate and the facing thereover are like those of the pressure plate and its facing. The gripper plate, its facing, and the back plate 330 are constructed with a nose portion 382 in alignment with the nose 376 of the pressure plate. The trailing ends of the clamps 366 and 368 have divergent flange portions 384 and 386. The flange portion 386 follows the contour of the back plate 330, which is provided at this location with a laterally disposed or offset integral deflector section 388.

The movable clamp 366 normally is maintained in its open position, as illustrated in FIG. 19, by retainers 396 mounted on the supporting plate 326. Each retainer includes a tubular cover 397, an expansion spring 398 therein and seated on the supporting plate, a retainer pin 400 extending inwardly therefrom, and an abutment ring 399 secured on the pin adjacent its covered outer end. The retainer pin extends through a bearing 401 in the supporting plate, and the inner end of the pin is secured to the mounting plate 370. The pin and the mounting plate are biased outwardly by the spring tension exerted against the abutment ring.

The movable clamp 366 is pneumatically operated by means of a flexible resilient, preferably elastomeric diaphragm or inflator 390 mounted on the inner surface of the supporting plate 326 and peripherally secured thereto by a holder ring 392. The outer side of the diaphragm communicates with an air pressure fitting 394 secured to and extending through the supporting plate. When compressed air is conveyed to the fitting, it causes the diaphragm to expand against the mounting plate 370 and apply pressure uniformly against the outer side thereof. The movable clamp 366 thereupon moves towards the stationary clamp 368, into a closed or clamping position, wherein a stocking 102 on a form 46 may be clamped between the clamps as illustrated in FIG. 18. The movable clamp is moved inwardly by the pressurized diaphragm against the tension of the retainer springs 398. When pressure is released from the fitting 394, the movable clamp is retracted by the retainers.

The pressure fitting 394 is connected through a valve 402 (FIG. 22) and a flexible tube or conduit 404 to supply and exhaust valve apparatus 405 (FIGS. 20 and 24) mounted on the carriage cylinder 298. The tube passes through a suitable opening in the adjusting bar lug 336 and is carried thereby. The tube is connected to a fitting 406 in the valve apparatus which communicates through several fittings with a rearwardly disposed normally closed supply valve 408 and a forwardly disposed normally closed exhaust valve 410 of the conventional types. The valve apparatus is mounted on the cylinder 298 by a holder 412.

The supply valve 408 includes a conventional tire valve 409, as shown in greater detail in FIG. 28. It also includes a generally tubular housing 411 for the tire valve, and a resilient elastomeric shock absorber ring 413 around the outer end of the housing. The tire valve is opened to admit compressed air by depressing its spring-pressed valve stem 414. This function is performed by the stem 416 of a generally conventional air chuck 418, which delivers compressed air to the valve. The chuck is mounted on the support form 282, as illustrated in FIG. 30. As seen in FIG. 20, the exhaust valve 410 is opened by depressing a spring-pressed stem 420 thereof. The stem is depressed by a threaded striker 422 adjustably mounted on a bracket 424. The bracket is secured on the slide rod 284 near the collector 292.

Referring also to FIGS. 1, 2 and 18, the operation of the stripper 290 involves, briefly, reciprocation on the slide rod 284 between a lower rear position engaging the air chuck 418 to pressurize the stripping head 296, and an upper forward position engaging the striker 422 to release the pressure on the head. In the rear position, the stripping head when pressurized engages a hosiery article 102 on a form 46, clamping the foot portion 110' of the article between the clamps 366 and 368. The stripping head removes the article from the form and suspends the article as the stirpper moves towards the forward position. The stripping head rotates during this movement to suspend the article ultimately so that it will hang flat and even from the collector 292. When the stripper is in the forward position, the release of pressure disengages the stripping head from the article, while the article is engaged by and transferred to the collector. The stripper then returns to the rear position, and the cycle is repeated.

The construction and operation of the stripper may be changed and modified while performing the illustrative and other stripping operations. For example, it may be desirable at times to employ two pneumatically movable clamps. The pressurizing and depressurizing operations may be varied, and the apparatus therefor arranged differently. Articles may be stripped from forms arranged in other ways and from other types of forms. The stripper is useful independently of the collector 292. The strippeer may be employed with other transfer means and other collecting means, and it may be modified accordingly.

Collector

Referring to FIGS. 18, 22, 24–27, and in particular FIG. 20, the collector includes a generally rectangular frame 426 constructed as a channel member having parallel top and bottom walls 428 and 430, respectively, a front wall 432, and parallel end walls 434 and 436. The frame is adjustably secured on the slide rod 284 by a mounting bracket 435. The bracket extends over the rod and is joined to the frame top wall 428 by screws 437 on opposite sides of the rod, to clamp the frame in place. The frame extends transversely of the slide rod with its longitudinal axis perpendicular thereto.

A tubular guide rod 438 is fixedly secured to the end walls 434 and 436, extending longitudinally therethrough. As seen in FIGS. 24–27, the rod is provided with a central oil passage 440, and oiler fittings 442 are provided at the respective ends of the rod. Lubrication openings 444 (FIG. 20) extend from the oil passage to the surface of the rod at points disposed approximately midway between the ends of the rod.

An actuator is reciprocably movable longitudinally on the guide rod 438. The actuator includes an actuator tube 446 secured at one outer end within a split actuator block 448 (see FIG. 27) having an integral annular shoulder 450. The tube is slidable on a bearing 452 (FIG. 29) located between the tube and the guide rod 438. The outer end of the tube is closed by a wiper ring 454 (FIG. 20) and a retaining ring 456 secured to the block. The opposite inner end of the tube similarly is slidable on a bearing 458, and is closed by a wiper 460 and a ring 462.

A clamp base tube 464 is mounted on the actuator tube 446 for sliding longitudinal movement thereon. Internal bearings 465 and 467 are provided at the opposite ends of the clamp base tube. A collar 466 is secured to one inner end thereof, as by welding, and an oiler 468 is mounted on the collar for lubricating the surface of the actuator tube 446. A wiper 469 is secured to the collar and contacts the surface of the actuator tube. A spring guide tube 470 is secured to the shoulder 450 and encloses the adjacent outer end of the clamp base tube 464. A coil compression spring 472 is mounted on the guide tube 470 and extends between the actuator block 448 and the collar 466, biasing the actuator and the clamp base tube apart.

The actuator comprising the tube 446 and the block 448 thus is reciprocably movable on the guide rod 438. The clamp base tube 464 is movable with the actuator and also reciprocably movable on the actautor tube. The actuator and the clamp base tube are resiliently interengaged by the spring 472, tending to urge the clamp base tube to an advanced or inner position with respect to the actuator block 448.

A clamping assembly of a clamp base 474 (FIG. 20) and a bifurcated clamp 476 is mounted on the actuator to project rearwardly therefrom. The assembly is movable by the actuator between advanced and retracted positions, and the clamp base and clamp are also movable in the same direction relative to each other. The clamp base is secured in fixed position on a holder 478 (see FIG. 26), in turn secured to the collar 466 on the inner end of the clamp base tube 464. The clamp base thus is movable with the clamp base tube. The base holder 478 secures the wiper 469 in position. Rollers 480 are mounted on the holder 478, and they engage a torque rail or bar 482 mounted on the inner surface of the front wall 432 of the collector frame. The rail serves to maintain the movable parts in their proper alignment.

The clamp 476 is secured in fixed position on a holder 484 (see FIG. 25). The clamp holder is fixedly secured to the inner end of the actuator tube 446. The clamp thus is movable with the actuator. The inner tube end ring 462 is fastened to the clamp holder 484 and secures the wiper 460 in position. Rollers 486 are mounted on the holder and engage the rail 482.

The clamp 476 is generally U-shaped, and it includes two fingers 476a and 476b which extend outwardly from the holder 484. As seen on reference to FIGS. 18 and 22, the clamp 476 registers with peripheral or marginal portions of the clamp base 474, on three sides thereof. The clamp and the base reciprocate together with the actuator tube 446, with the clamp base bearing on the surface of the clamp due to the tension of the spring 472. At the same time, the position of the clamp base on the actuator tube may be changed, moving the base apart from the clamp. Such is the case when the clamp base encounters resistance to its movement, as when transferring hosiery from the stripper 290 and when hosiery is clamped between the base and the clamp, as described subsequently.

As seen in FIGS. 20, 24 and 27, the actuator is moved reciprocably by operating levers 488 and 490. The levers have slots therein, as indicated at 492, which receive upper and lower connecting pins 494 and 496, respectively, secured on the upper and lower sides of the actuator block 448. The levers are fixed to a hub 498 rotatable on an axle 500. The axle is secured to and extends between spaced rearward extensions 502 and 504 of the respective frame top and bottom walls 428 and 430.

The lower lever 490 is in the form of a bell crank lever having an outwardly extending arm 506. An operating link 508 is pivotally connected thereto by means of a bolt 510. A recess 512 (FIG. 20) is provided in the lower extension 504 to accommodate the head of the bolt as the link moves towards the collector frame. By moving the link to and from the frame, the levers are moved to and from the alternate positions illustrated in FIG. 20. The phantom line position of the lever 488 corresponds to the position of the link 508 nearest to the frame, and the solid line position of the lever corresponds to the position of the link farthest from the frame. The actuator block 448 reciprocates with the actuator tube 446 between the advanced position illustrated and a retracted position adjacent to the end wall 436.

Operation of the collector 292 involves reciprocal movement of the actuator tube 446 between advanced positions wherein the clamp base 474 and the clamp 476 effect transfer of a hosiery article 102 thereto from the stripper 290, and the retracted position wherein hosiery articles are clamped together in a group between the clamp base and clamp, and are suspended therefrom until removed. Initially, the collector is retracted. When the stripper reaches its forward position, the collector is advanced to engage the toe portion 114′ of a hosiery article on the stripper and remove the article as it is released by the stripper. The stripper is returned to its rear position, and the collector is retracted bearing the hosiery article, suspended by its toe portion together with articles previously collected. The operation of the stripper and of the collector are described in greater detail hereinafter.

The collector may be employed with other types of stripping apparatus. It may be used for transferring and collecting articles following other operations. In each use, various changes and modifications may be made while achieving the objects of the invention.

*Stripper assembly operation*

The detailed operation of the stripper assembly 16 will be seen on particular reference to FIGS. 1, 2, 18, 20, 22, 24 and 32–42. Commencing with the stripper 290 descending as illustrated in FIG. 2, a form 46 bearing a dried stocking 102 emerges from the drying cabinet 220 and enters the stripping zone 56 (FIG. 3). The stripper clamps 366 and 368 move into positions on opposite sides of the form in parallel thereto, as illustrated by the phantom position of the stripper in FIG. 18 and as shown schematically in FIG. 32. The stripper clamps are disposed on the sides of the foot sections 110 and 110′ of the form and hose, forwardly of the ankle and instep portions thereof. The nose portions 376 and 382 of the clamps are located on opposite sides of the toe portions 114 and 114′ of the form and hose, centrally thereof and leaving peripheral parts of the toe portions uncovered.

The air supply valve 408 engages the air chuck 418, in the manner illustrated in FIGS. 20 and 28. Compressed air is admitted to the air chuck and thereby to the supply valve when the stripper 290 is stopped preceding its upstroke, by means subsequently described. With the hosiery form 46 moving in the stripping zone, the movable clamp 366 is moved pneumatically towards the stationary clamp 368 on the stripper head 296 to clamp the hosiery article foot section 110′ between them while the article is on the form.

In stripping the hosiery article from the hosiery form, the form moves horizontally in the stripping zone 56 at a rate or velocity V, as schematically represented by the corresponding arrow in FIG. 32. The stripping head 296 moves obliquely upwardly at a greater velocity $nV$, along a path at the angle of the slide rod 284, as represented by the corresponding arrow in FIG. 32. The factor $n$ may be, for example, approximately 5, so that the stripper velocity is approximately five times that of the hosiery form. The angle of the stripper path, measured from the horizontal plane, preferably is slightly less, e.g. several degrees, than the angle of the longitudinal axis of the foot 110 of the hosiery form, as represented by the angle A. The resultant path of movement of a point on the stocking 102 and its velocity, both relative to the hosiery form 46, are represented by the arrow R in FIG. 32. This path of stripping movement substantially coincides with the longitudinal axis of the foot section, so that the hose is pulled from the form in the desired manner.

A feature of the invention constitutes means for imparting an initial lift to the hose, towards the sole 110a of the hosiery form, as illustrated by the curved arrow L in FIG. 33, which corresponds to the path of movement of one point on the hose. When the hose is initially clamped and pulled at the start of stripping, accelerated movement is imparted to the carrier link 58 on which the form is mounted for a brief period of time. At this time, the velocity of the form more nearly approaches the horizontal component of motion of the stripper. Consequently, an increased component of upward motion is imparted to the hose to lift it relative to the form. This movement releases the heel pocket 112' of the hose from the protruding heel portion 112 of the form, which would otherwise resist pulling along the path R and tend to unduly stress the hose. After the accelerated movement of the form, the stripper moves relative to the form as shown in FIG. 34 to complete the stripping.

The accelerated movement of the carrier link 58 and the form 46 thereon results from the construction and operation of the conveyor 44 driven by the gear 180, and the construction of the primary conveyor track 48 having arcuate and linear sections 48a and 48b intersecting at the front corner 48c, as best seen in FIG. 3. As each carrier link 58 enters the stripping zone 56, one of the preceding conveyor links is turning the front corner 48c. The change in direction of the conveyor link turning the corner with its leading end moving at constant speed produces an accelerated linear movement of its trailing end as the turn is completed, which acceleration is imparted to the carrier link in the stripping zone owing to the interconnection of the links. The lifting action on the hose may be augmented or effected entirely by timing the stripper operation for relatively slow movement thereof when stripping commences following the clamping step.

The stripper head 296 remains in the same angular position as guided by the rear guide bar section 353 during stripping and following removal of the hose 102, the latter condition being represented in the right-hand position in FIG. 35. At this point, the hose is held and suspended vertically in somewhat the same position as when on the form 46, except that the heel and leg sections sag due to gravity. The guide roller 350 on the stripper next engages the upper track 354 on the guide bar, which cams the roller in the clockwise direction to cause the stripping head 296 to rotate in the same direction about its pivot 342. The stripping head thereby assumes a second position as represented in FIG. 35, wherein it is rotated in vertical planes with respect to its first position.

The stripping head continues to be rotated in the same manner until it reaches its transfer position illustrated in FIG. 22. The hose then is disposed so that it may be hung by its end, substantially evenly and without appreciable sagging. In particular, the hose is presented for transfer to the collector 292 so that it may be gripped at its toe portion 114', and when released by the stripping head and fixedly suspended only by the toe portion with the toe portion oriented in the same manner, the article will hang vertically and evenly. In other words, there will be no gravitational torque about the points of suspension producing folds in the hose. The hose 102 then is transferred to the collector 292, and suspended therefrom in the foregoing condition, as represented by the left-hand position of the hose in FIG. 35. The hose is suspended by its toe portion 114' from the collector with the toe portion in the same position as held by the rotated stripper, so that the hose is substantially smooth and unwrinkled.

In transferring the hose 102 from the stripper 290 to the collector 292, the toe portion 114' of the hose is held by the stripper nose portions 376 and 382 in line with the collector clamp base 474 and clamp 476, as seen in FIG. 22, while the latter are in retracted positions as illustrated in FIGS. 36 and 37. In the illustrations of FIGS. 36–42, the collector is shown as suspending two hose 102' previously transferred thereto.

The collector is next operated by the operating link 506, through the levers 488 and 490, to advance the clamping assembly of the clamp base 474 and clamp 476, moving them to the left as seen in FIG. 38. At this time, the deflector section 388 of the back plate 330 on the stripping head moves aside the loose ends of the hose 102' previously collected, so that they will not interfere with the transfer. The clamp 476 moves against one (right-hand) side of toe portion 114', as seen in FIG. 38. It will be noted from this view and FIG. 22 that the nose portions 376 and 382 (hidden in these views) of the stripper register with the space between the fingers 476a and 476b of the collector clamp 476.

The clamp 476 continues to move to the left. As illustrated in FIG. 39, the clamp fingers 476a and 476b move the unsupported peripheral portions of the toe 114' of the hose 102 out of the way. The clamp advances past the toe and past the nose portions 376 and 382 of the stripper, to a position as illustrated in FIGS. 40, 41, and also FIG. 20. The toe portion 114' of the hose is held by the stripper nose and adjoining portions in such a way that the peripheral toe portions may be deflected by the clamp fingers in the direction of movement, as seen in FIG. 39, and thereafter the peripheral toe portions resiliently return to a flat condition, as seen in FIG. 40.

Meanwhile, the collector clamp base 474 acting through the hose 102' thereon, bears or abuts on the inner nose portion 382 on the stationary stripper clamp 368 and the back plate 330, as illustrated in FIGS. 39–41. Due to the resilient interengagement of the collector clamp base and the actuator assembly as provided by the spring 472, movement of the clamp base may stop while the collector clamp 476 continues to advance. The hosiery articles 102' previously collected are resiliently clamped between the inner nose portion 382 and the collector clamp base when the collector clamp disengages therefrom.

The collector clamp 476 rapidly returns to the position illustrated in FIG. 42, wherein the fingers 476a and 476b clamp the flat peripheral portions of the toe 114' of the hose 102 being transferred against the adjacent hose 102' on the clamp base 474. Meanwhile, air pressure is released from the stripping head relatively slowly, by engagement of the striker 422 with the stem 420 on the stripper exhaust valve 410, and the movable stripper clamp 366 commences to separate from the stationary stripper clamp 368. The stripper supports the hosiery article 102 being transferred and also holds the previously collected hose 102' on the clamp base until all of the hose are clamped together on the base by the collector clamp 476. At this time, the stripper nose portion 376 on the movable stripper clamp is in the open position illustrated in FIG. 42.

The collector clamping assembly in the position of FIG. 42 takes the pressure off of the back of the inner nose portion 382, so that the stripper may then be withdrawn. Referring to FIG. 22, the stripping head immediately commences to rotate in a counterclockwise direction as it is withdrawn, so that the nose portions 376 and 382 thereof clear the clamp fingers 476a and 476b and may be withdrawn therefrom. When the stripper is clear of the collected hosiery, the clamping assembly of the collector is retracted to the initial position illustrated in FIG. 36, by means of the operating link 508. The stripping and collecting cycle may be repeated indefinitely to strip and collect hose borne by successive forms, as long as the machine is in operation.

A plurality of hose 102 are supported together by the collector in a compact neat group or bundle, being supported solely by their toe portions while hanging evenly. A predetermined number of hose may be collected, e.g., a dozen or more. They may be removed by the operator simply and safely by grasping the group and pulling downwardly, to remove the toes from between the clamp base and clamp. The group of hose is also adapted for mechanical removal, if desired. The group may be laid on a table, cart, conveyor, etc., and it is ready for further operations, such as tying the hose together, without further attention on the part of the operator.

*Stripper assembly drive mechanism*

Referring to FIGS. 14, 15, and 29–31, in particular, the drive assembly 18 drives the stripper 290 and the collector 292 synchronously in accurately timed relationship with each other and with the transport assembly 14. The lower shaft 202 of the speed reducer 198 is joined by a coupling 514 with one shaft of a right angle drive mitre box 516 supported by the crossbeams 30 and 32. A drive shaft 518 for the stripping assembly is joined to a shaft on the output side of the mitre box by a coupling 520. The outer end of the drive shaft is journaled on a standard 522 secured to a mounting plate 524, in turn secured to the crossbeams 30 and 32 therebeneath.

*Stripper drive*

A stripper drive crank 526 is fixedly secured to the outer end of the drive shaft 518 for rotation therewith, and a cam follower roller 528 is mounted on the outer end of the crank. A stripper drive lever 530 is pivotally mounted for movement in transverse planes adjacent to the crank. The lever is mounted on a pivot pin 532 carried by a lever mount 534 secured to the mounting plate 524. A balancing spring 535 (FIG. 9) is joined to the lever and to the base 10 of the machine. A bracket having a cam track or race 536 is mounted on the drive lever, and it defines a cam groove or slot 538 including a curved acceleration-dwell sector 540. The cam groove receives the crank roller 528 therein, with the curved sector 540 being concentric with the axis of rotation of the drive shaft 518 when in the phantom position illustrated in FIG. 29. As the drive shaft and the crank are turned, the drive lever 530 is reciprocated back and forth between the solid and phantom line positions thereof. In the several positions, the center of gravity is more or less to one side or the rear of the drive shaft, and the lever is counterbalanced by the spring 535. The use of this spring is optional, and it may be eliminated if desired. One crossbeam 32 is cut away to accommodate the lever movement, as seen in FIGS. 14 and 29.

The drive lever 530 is connected to one end of a stripper drive rod 542 by means of a linking member 544 pivotally mounted on the outer end of the drive lever. The opposite end of the drive rod is secured in threaded engagement to the drive link 306 pivotally mounted on the cylinder 298 of the stripper carriage 294. The drive lever and the drive rod extend through an elongated opening 546 in the platform 26 in the several positions thereof. Similarly, the slide rod 284 and the drive rod 542 extend through an opening (not shown) in the front wall 222.

As the drive shaft 518 rotates, the stripper 290 is moved back and forth on the slide rod 284 between the stripping and transferring positions thereof, as previously described. The position shown in solid lines in FIG. 29 represents the reversal point for the stripper, when it stops and changes from rearward to forward movement. The stripper clamps 366 and 368 are actuated at this point to clamp a hosiery article borne by a form 46. Thereafter, the stripper commences its forward stripping movement in timed relationship to the conveyor 44, initially producing the above described hose lifting action illustrated in FIG. 33. The stripping movement includes an acceleration produced by the acceleration-dwell sector 540, which follows the lifting action. The hose is thereafter stripped from the form as graphically represented in FIG. 32. At the other end of the stroke, where transfer to the collector 292 takes place as illustrated in FIGS. 36 to 42, the stripper dwells in one position sufficiently long for the transfer to take place. At this time, the parts are in their positions illustrated in phantom lines in FIG. 29. The crank roller 528 moves in the curved sector 540 and in an arc concentric therewith thereby providing the dwell period.

*Collector drive*

As illustrated in FIGS. 14 and 15, a collector cam wheel 550 is fixed on the drive shaft 518 by a key 552, near the standard 522. An air control valve opening cam 558 is provided on the rim of the cam wheel, for a purpose described subsequently. The cam wheel has a cam groove 554 around the outer side surface thereof, which includes an actuating sector 556. A collector actuating lever 560 is mounted adjacent to the cam wheel, and a cam follower roller 562 is mounted on the inner side thereof, and received in the cam groove. The lever is secured to a hub 564 pivotally mounted on angle brackets 566, in turn secured to a crossbeam 30. With the roller received in the cam groove, the actuating lever is pivotally mounted so that its free outer end moves up and down as the wheel rotates with the drive shaft 518. An upwardly extending collector actuating rod 568 is connected at its lower end to the outer end of the actuating lever 560, by means of a linking member 570 pivotally mounted on the lever. The rod extends upwardly through an opening 572 in the platform 26, and thereabove adjacent to the support block 282.

As seen in FIGS. 30 and 31, a pair of triangular actuating brackets 574 is pivotally mounted on the block 282 adjacent to the upper end of the actuating rod 568, by means of a transverse pivot rod 576 journaled in the block and secured at one apex of each bracket. The pivot rod is lubricated by an oil fitting 577. The upper end of the actuating rod is secured to a linking member 478, and the member is pivotally mounted on the brackets 574 at a second apex thereof. A second linking member 580 is pivotally mounted on the brackets, at the third apex thereof.

One end of an extensible collector connecting rod 582 is secured to the second linking member 580 and extends through the front wall 222. The connecting rod includes a body section 583 (see FIG. 20) having a tubular outer end, and a calibrated extension section 584 telescopically received in the tubular end. The parts are secured in desired fixed positions relative to each other by a lock pin 586 extending therethrough. The outer end of the extension section is secured in threaded engagement to the collector operating link 508.

With the machine in operation and the drive shaft 518 rotating, the collector cam wheel 550 rotates and the cam follower roller 562 follows the cam groove 554 in the wheel. For part of the time, the collector actuating lever 560 is in raised position, wherein the actuating rod 568 is raised. The condition is illustrated in FIG. 15, with the high point of the cam groove lying at the bottom of the wheel. The connecting rod 582 is also raised, so that the collector is in the retracted position illustrated in FIG. 36. During this time, the stripper 290 performs the stripping operation and moves to the transfer position as also represented for the nose portions 376 and 382 thereof in FIG. 36.

After the stripper reaches the transfer position and commences to dwell therein, the cam wheel 550 reaches a position in which the cam follower roller 562 is in the actuating sector 556 of the cam wheel groove, the low point of which is diametrically opposite to the aforementioned high point. The roller is lowered, and consequently, the actuating lever 560, the actuating rod 568, and the connecting rod 582 are lowered or retracted from the collector. The collector then is in the advanced position illustrated in FIG. 41.

As the cam wheel 550 continues to rotate, the actuating lever 560 and therefore the connecting rod 582 are raised, to cause the parts to be moved into their positions illustrated in FIG. 42. As previously described, the collector parts clamp the hosiery article 102 from the stripper, together with the other articles 102', between the collector clamp base 474 and the collector clamp 476. When the stripper 290 and the nose portions 376 and 382 thereof then move to a position clear of the hose, in moving from the collector towards the stripping position, continued rotation of the cam wheel 550 causes the actuating lever 560 to be raised to raise the connecting rod 582, wehereupon the collector returns to the retracted position illustrated in FIG. 36.

*Stripping head operating means*

The supply of compressed air to the stripping head 296 is controlled by an air control valve 590, illustrated in FIG. 15. The valve inlet is connected by a flexible tube 592 to a source of compressed air, not illustrated. The valve outlet is connected by a flexible tube 594 to a fitting 596 mounted on a flange 602 of the support block 282, as seen in FIG. 30. A rigid air chuck mounting tube or conduit 598 is secured to the opposite end of the fitting, and the tube is slidable in a bearing 600 mounted in the flange. A retainer 609 is fixed on the mounting tube, and a coil compression spring 606 is mounted on the tube, between the retainer and the flange 602. The mounting tube extends outwardly through a tubular boss 608 on the front wall of the support block, and through the front wall 222 of the cabinet. The mounting tube is urged outwardly by the spring, while yielding to inwardly directed force on its outer end. In the extended position of the tube, the retainer 609 bears on the boss. The previously described air chuck 418 is mounted on the outer end of the mounting tube.

Referring again to FIG. 15, an operating lever 610 is pivotally mounted on the control valve 590, for opening and closing the valve. The lever is resiliently mounted so that it is normally extended with the valve closed. A roller 612 is mounted on the outer end of the lever, and it is arranged for engagement with the control valve opening cam 558 mounted on the rim of the collector cam wheel 550. When the roller engages the cam, the lever 610 is depressed to open the control valve. The valve is opened when the stripper 290 descends and the air supply valve 408 thereof engages the air chuck 418, as shown in FIG. 28, and at the time the stripper reverses direction to commence its upward movement, as described above with reference to FIG. 29.

Referring to FIG. 28, the air supply valve 408 and the air chuck 418 are normally closed under spring tension applied to the respective stems 414 and 416. Thus, the supply valve stem 414 is urged outwardly by a compression spring 614 to close the valve. The valve is closed by a valve element connected to the stem and engaging a valve seat, in a conventional manner which therefore is not shown. The air chuck 418 is also conventional, with a modification adapting it for the present purposes. The movable valve stem 416 of the chuck extends through an opening in a rubber seal 616, and the stem conventionally closes the opening to close the chuck against escape of air. In the modification, bleeder holes or perforations 618 are formed in the seal, for a purpose described below.

When the stripper air supply valve 408 and the air chuck 418 are in engagement, they are opened by interengagement of the respective stems 414 and 416. With the control valve 590 open, compressed air enters the supply valve and is conveyed by the stripper tube 404 to the fitting 394 in the stripper supporting plate 326, as seen in FIGS. 18 and 19. As previously described, the diaphragm 390 is inflated against the mounting plate 370, to move the movable clamp 366 towards the stationary clamp 368. With the hose 102 gripped by the clamps as shown in phantom lines in FIG. 18, stripping commences and continues as the stripper 290 moves upwardly on the slide rod 284.

The air supply valve 408 separates from the air chuck 416 and closes as the stripper moves upwardly, so that pressure continues to be exerted against the movable clamp 366. The hose is drawn from the hosiery form 46 and carried to the transfer position with the hose continuing to be clamped by the stripper, until the striker 422 (FIG. 20) engages the stem 420 of the normally closed exhaust valve 410. As previously explained, air then bleeds from the stripper relatively slowly, releasing the pressure on the diaphragm 390 and thus on the movable clamp 366, as the transfer takes place. The stripper clamps 366 and 368 are opened and remain open until the stripper once more descends and the supply valve 408 engages the air chuck 418, whereupon the cycle is repeated.

When the supply valve 408 disengages from the air chuck 418, pressure remains in the line from the control valve 590 to the chuck. The bleeder holes 618 shown in FIG. 28 permit air to escape from the line, so that no pressure remains therein when the supply valve and chuck are next engaged. Premature operation of the movable stripper clamp 366 is prevented in this manner, and the supply of air to the stripper is controlled entirely by the control valve 590.

*Stripper assembly adjustment*

The stripper assembly 16 is calibrated for adjusting the settings of the stripper and the collector according to the size of the hosiery form 46, which thus may be varied as desired for different size hose 102. Referring to FIG. 20, a stripping head scale 620 is provided on the underside of the mounting plate 300 for adjustment of the stripping head 296. The scale is arranged for cooperation with the rear edge 622 of the adjusting bar 334. The adjusting screws 344 are loosened, and the stripping head is moved longitudinally with respect to the slots 346 until the edge 622 is aligned with one of the marks 624 on the scale, A, B, C, D, E, etc. The marks may correspond to several sizes of hosiery forms 46 that may be employed on the transport assembly 14. In the illustration, the stripping head is set at the mark E. Alternatively, the stripping head may be adjusted directly to a hosiery form while in the position illustrated in phantom lines in FIG. 18. Following adjustment, the screws 344 are tightened to secure the head in place.

Referring to FIG. 22, a collector frame scale 624 calibrated in the same manner as the stripping head scale 620 is mounted on the outer side of the torque bar 314 adjacent to the front end thereof. The collector frame 426 and the guide bar 352 are adjusted relative to the scale, aligning the front edge of the guide bar mounting bracket 358 with the same mark on the scale as the setting on the stripping head scale, in this case the mark E. The screws 437 (FIG. 20) on the frame mounting bracket 435 are loosened to permit adjustment of the frame on the slide rod 284, and are then tightened to secure the frame in the desired position. The guide bar 352 is adjusted at the bracket 364 (FIG. 2) mounted on the cabinet front wall 222.

As seen in FIG. 20, the telescoping extension section 584 of the connecting rod 582 is provided with a scale 626 graduated to correspond to the foregoing two scales, with the graduations increasing in the opposite direction. The position of the extension section is adjusted with respect to the outer edge 628 of the body section 583 of the rod. Again, the setting is on the mark E. Adjustment is made by removing the lock pin 586, setting the component sections on the desired mark, and replacing the pin.

*Operation of machine*

In using the new hosiery boarding machine, a plurality of hosiery forms 46 suitable for drying the particular hose 102 being processed, are secured on the form mounting blocks 64. While the illustrative forms all have the same dimensions, it is also possible to employ forms of various dimensions at the same time. Thus, each of the above-described settings of the stripper and the collector will accommodate a number of different forms and corresponding hose. In the illustrative embodiment, the conveyor is constructed to hold 36 forms, but more or less might be employed, making appropriate adjustments in the machine where necessary.

The machine is operated by a single operator. Pressure steam is supplied to the heat exchanger 262 by opening a valve (not shown) in the steam line 263 thereto. The operator commences with a supply of damp hose in a bin 630 (FIGS. 1 and 2) mounted at the front of the base 10, on the base wall 20 at the upper end thereof. The operator presses a switch button in the control box 192 to start the drive motor 188 and the fan motor 258. With the drying cabinet 220 at the proper temperature, the operator commences to place damp hose from the bin 630 on the forms 46.

Referring to FIGS. 1 and 3, the operator places a damp hose on each successive form as it moves in the boarding zone 52 at the front of the machine. The open end 104 of the hose is pulled over the toe portions 114 of the form, and down the form beyond the shank 108. This operation is facilitated considerably by the tangential disposition of the forms, as illustrated in FIG. 3, wherein the toe portion of each form is directed outwardly of the conveyor and therefore readily accessible to the operator. The operator straightens the hose on the form if necessary, so that its appearance resembles that illustrated in FIG. 1.

The forms bearing the hose enter the drying cabinet 220, through the entrance doorway 221 thereof. The conveyor is folded at the switch 160, so that the forms are disposed in a compact group abreast of each other, as illustrated in FIGS. 3, 6, 9, and 16. The forms travel through the drying zone 54 in the cabinet, and the hose are dried by the hot air circulating therein. Moisture is removed by discharging a portion of the circulating air through the exhaust openings 268 in the roof 233.

The conveyor 44 is unfolded at the switch 172. The conveyor and the forms 46 emerge through the exit doorway 223, with the hose on the forms dried to the desired extent. The forms enter the stripping zone 56, whereupon the stripper engages the hose on each form in succession, as described above, and as illustrated in the phantom lines in FIG. 18. The conveyor and the forms continue to move as stripping takes place, the stripping operation being as schematically illustrated in FIGS. 32–34. Each hose is then delivered to the collector 292 and transferred thereto, as schematically illustrated in FIGS. 35–42. During the delivery and transfer of each hose, the form 46 from which the hose has been removed is moved into the boarding zone 52 by the conveyor, where another article is placed on the form, and a new cycle commences.

When a predetermined number of hose 102 have been stripped from successive forms and accumulated on the collector 292, they are removed in a group by the operator and laid on a cart, table, or conveyor, as desired, for tieing or other further processing. Removal from the collector is accomplished by grasping the group of hose and pulling downwardly, to remove them from between the collector clamp base 474 and clamp 476. If desired, the machine may be stopped for this or any other purpose by pressing a stop button on the control box 192 at the front of the machine.

Operation of the machine is quiet, convenient, and safe. The hosiery is processed without distortion or damage. The assembly is rigid and sturdy. The forms 46 do not wobble as in the past, which makes it easier for the operator and is in part responsible for the quiet operation and durability of the machine. The maintenance requirements are relatively small, little wear takes place, and operation is reliable and trouble free.

The invention thus provides hosiery processing machinery and apparatus which accomplish the various objects set forth, and which may be employed for a number of hosiery processing operations. While preferred embodiments of the machinery and apparatus have been shown and described, which are especially adapted for drying hosiery in a boarding machine or the like, it will be apparent that they may be employed for other operations, and the machinery and apparatus may be constructed and arranged in other ways therefor. Similarly, the construction and arrangement of the several components of the machinery and apparatus may be changed and modified. Various such alterations, changes and modifications may be made within the spirit and scope of the invention, and it is intended that they be included within the scope of the appended claims.

What is claimed is:

1. In hosiery boarding machinery having a drying chamber and both a stripping zone and a loading zone outside said drying chamber, a succession of elongated links pivotally connected together at their adjacent end portions to form an endless chain movable along a generally horizontal path through said chamber and said zones, said links being movable relative to each other from an extended condition of the chain in which adjacent ones of said links are disposed in generally end-to-end relation and a collapsed condition of the chain in which alternate ones of said links are disposed in generally side-by-side relation, generally upright hosiery boarding forms carried by said chain and being mounted for movement with alternate ones only of said links, each of said forms extending longitudinally of its corresponding link with the foot portion of the form being disposed above the link and with the toe portion of the form facing the leading end of the link, continuously rotatable drive means located exteriorly of said drying chamber and operatively engaging said chain to pull said chain from the exit end portion of the drying chamber in an extended condition with said forms disposed in generally single file relation and to pass said extended chain continuously through the stripping and loading zones and to push said extended chain into the entrance end portion of the drying chamber, means for stripping hosiery from said continuously moving forms passing through said stripping zone, and means for guiding said chain through said drying chamber in a collapsed condition with said hosiery forms disposed in a compact side-by-side relation.

2. In a hosiery boarding machine, means providing a processing chamber and a loading station externally of said processing chamber, a plurality of pairs of hinged chain sections pivotally connected together to form an endless chain extending from said loading station through said processing chamber and back to said loading station, the sections of each of said pairs being pivotable from an extended position to a collapsed position, hosiery boarding forms carried in substantially vertical position by certain of said sections, means for maintaining the sections in extended position as the forms pass the loading station in spaced substantially vertical single file relation, means for moving the sections from an extended position to a collapsed position to bring the forms into vertical side-by-side relation following the entrance of the forms into the processing chamber, and means for moving the sections from the collapsed position to an extended position prior to the movement of the forms out of the processing chamber, whereby the forms move through the processing chamber in substantially vertical side-by-side relation at a slower rate than they move in substantially vertical single file relation from the processing chamber past the loading station and back into the processing chamber.

3. In a hosiery boarding machine, means providing a loading zone and a processing zone, a succession of elongated members pivotally connected together at their end portions to form an endless conveyor movable through said zones, adjacent ones of said pivotally connected members being relatively movable from an extended position to a collapsed position, hosiery boarding forms carried in substantially vertical position by alternate ones of said members for successive movement through said zones, means for moving said members from an extended single file position to a collapsed relatively adjacent side-by-side position as the forms move into the processing zone and from collapsed side-by-side position to extended single file position as the forms move out of the processing zone whereby said forms are moved in individual succession at a given rate through the loading zone and are moved in a group at a slower rate through the processing zone.

4. In a hosiery boarding machine, means providing a loading zone and a processing zone, a plurality of pairs of hinged links pivotally connected together to form an endless conveyor extending through both zones, the links of each of said pairs of hinged links being pivotable from an extended position to a collapsed position, hosiery boarding forms carried in substantially vertical position by alternate links of said conveyor, means operatively engaging said pivotally connected links when in extended position for driving said conveyor, and means for moving said links from extended position with said forms in substantially vertical spaced single file relation to collapsed position with said forms in substantially vertical side-by-side relation as the forms enter the processing zone and for moving the links from collapsed to extended position as the forms leave the processing zone, whereby said forms are moved in single file succession at a given rate through the loading zone and are moved in side-by-side relation at a lower rate through the processing zone.

5. In a hosiery boarding machine, means providing a loading zone and a processing zone, a succession of elongated links pivotally connected together at their end portions to form an endless chain extending through both zones, adjacent ones of said links being pivotable from an extended position to a collapsed position, hosiery boarding forms carried in substantially vertical position by alternate ones of said links of said chain, continuously moving drive means continuously engaging said chain at a location where said links are in extended position for driving said chain, and means for moving said links from extended position with said forms in substantially vertical spaced single file relation to collapsed position with said forms in substantially vertical side-by-side relation as the forms enter the processing zone and for moving the links from collapsed to extended position as the forms leave the processing zone, whereby said forms are moved in single file succession at a given rate through the loading zone and are moved in side-by-side relation at a lower rate through the processing zone.

6. A hosiery boarding machine as defined in claim 5, wherein said links are provided with gear teeth along the edges thereof facing the inside of the path of the endless chain and wherein said drive means is a gear engaging said teeth.

7. In a hosiery boarding machine, means providing a loading zone and a processing zone, a plurality of pairs of hinged links pivotally connected together to form an endless conveyor extending through both zones, the links of each of said pairs of hinged links being pivotable from an extended position to a collapsed position, a stocking boarding form carried in substantially vertical position by one link of each pair, means for moving each pair of links from an extended position with the boarding forms in substantially vertical single file relation to a collapsed position with the forms in substantially vertical side-by-side relation as the boarding forms reach the processing zone and means for moving each pair of links from a collapsed position to an extended position as the boarding forms leave the processing zone whereby to move a large group of boarding forms in side-by-side relation at a slow rate through the processing zone and at a higher rate in single file relation through the loading zone.

8. In a wearing apparel processing machine having a processing zone and a loading zone, a plurality of conveyor links pivotally connected together to form an endless conveyor extending through both zones, adjacent ones of said links being disposed in different planes and alternate ones of said links being disposed in common planes, a guide roller associated with each of the links, adjacent ones of said guide rollers being positioned in different planes and alternate guide rollers being positioned in common planes, apparel forms carried by alternate links, a guide track engaging alternate rollers lying in one plane and a second guide track engaging alternate rollers lying in the other plane, said guide tracks having aligned portions for maintaining adjacent links in end-to-end aligned relation as the links move along the loading zone and having spaced parallel portions for maintaining adjacent links in side-by-side relation as the forms move along the processing zone and having diverging and converging portions for moving adjacent links from and to said end-to-end aligned relation and to and from said side-by-side relation.

References Cited

UNITED STATES PATENTS

| 2,534,054 | 12/1950 | Parkes | 198—129 |
| 2,550,716 | 5/1951 | Parkes | 34—24 |
| 2,646,194 | 7/1953 | Berger | 223—76 |
| 3,054,542 | 9/1962 | Glaze | 223—112 |
| 3,231,158 | 1/1966 | Rossak | 223—76 |

FOREIGN PATENTS

| 1,166,743 | 6/1958 | France. |
| 1,320,326 | 1/1963 | France. |

JORDAN FRANKLIN, *Primary Examiner.*

G. V. LARKIN, M. J. COLITZ, *Assistant Examiners.*